(12) United States Patent
Bell et al.

(10) Patent No.: US 11,204,972 B2
(45) Date of Patent: Dec. 21, 2021

(54) COMPREHENSIVE SEARCH ENGINE SCORING AND MODELING OF USER RELEVANCE

(71) Applicant: eBay Inc., San Jose, CA (US)

(72) Inventors: Anthony Bell, San Jose, CA (US); Daniel Miranda, San Jose, CA (US); Prathyusha Senthil Kumar, Morgan Hill, CA (US)

(73) Assignee: EBAY INC., San Jose, CA (US)

( * ) Notice: Subject to any disclaimer, the term of this patent is extended or adjusted under 35 U.S.C. 154(b) by 513 days.

(21) Appl. No.: 16/017,700

(22) Filed: Jun. 25, 2018

(65) Prior Publication Data
US 2019/0392082 A1 Dec. 26, 2019

(51) Int. Cl.
| G06Q 30/00 | (2012.01) |
| G06F 16/9535 | (2019.01) |
| G06Q 30/06 | (2012.01) |
| G06N 20/00 | (2019.01) |
| G06F 16/2457 | (2019.01) |

(52) U.S. Cl.
CPC .... *G06F 16/9535* (2019.01); *G06F 16/24578* (2019.01); *G06N 20/00* (2019.01); *G06Q 30/0625* (2013.01)

(58) Field of Classification Search
CPC .... G06N 20/00; G06N 3/08; G06F 16/24578; G06F 16/9535; G06Q 30/0625
USPC ..................................................... 705/26, 27
See application file for complete search history.

(56) References Cited

U.S. PATENT DOCUMENTS

| 9,372,893 | B2 | 6/2016 | Lin et al. |
| 9,424,299 | B2* | 8/2016 | Bufe ................. G06F 40/30 |
| 9,619,526 | B1 | 4/2017 | Hoover et al. |
| 9,672,554 | B2 | 6/2017 | Dumon et al. |
| 9,760,831 | B2 | 9/2017 | Tavakkol et al. |
| 2011/0184806 | A1* | 7/2011 | Chen ................. G06Q 30/02 705/14.52 |
| 2012/0209847 | A1* | 8/2012 | Rangan ............. G06F 16/3347 707/737 |
| 2013/0159320 | A1* | 6/2013 | Gao .................. G06F 16/9535 707/748 |

(Continued)

FOREIGN PATENT DOCUMENTS

| CN | 10660372 A | 4/2017 |
| GN | 106600372 A | 4/2017 |
| JP | 2012203821 A | 10/2012 |

OTHER PUBLICATIONS

TRSDL: Tag-Aware Recommender System Based on Deep Learning—Intelligent Computing Systems, Liang, Nan; Hai-Tao, Zheng; Jin-Yuan, Chen; Sangaiah, Arun Kumar; Cong-Zhi Zhao. Applied Sciences8.5 MDPI AG. (May 2018); Dialog 16pgs.*

(Continued)

*Primary Examiner* — Robert M Pond
(74) *Attorney, Agent, or Firm* — Shook, Hardy & Bacon L.L.P.

(57) ABSTRACT

A query for one or more resources is received. One or more tokens associated with the query is identified based on running the query through a learning model. The one or more tokens correspond to one or more terms that the query shares context similarity to based on a history of user selections. One or more search result candidates are scored based at least on the context similarity between the one or more tokens and the query.

20 Claims, 11 Drawing Sheets

(56) References Cited

U.S. PATENT DOCUMENTS

| | | | |
|---|---|---|---|
| 2014/0222803 A1 | 8/2014 | Bowman et al. | |
| 2016/0098398 A1* | 4/2016 | Bufe | G06F 16/313 |
| | | | 707/741 |
| 2016/0371379 A1* | 12/2016 | Fang | G06F 16/951 |
| 2017/0061481 A1* | 3/2017 | Wee | G06Q 30/0201 |
| 2017/0109357 A1* | 4/2017 | Gupta | G06F 16/24575 |
| 2017/0213274 A1 | 7/2017 | Vijayaraghavan et al. | |
| 2018/0349477 A1* | 12/2018 | Jaech | G06F 16/9535 |
| 2019/0266288 A1* | 8/2019 | Shukla | G06F 16/24578 |

OTHER PUBLICATIONS

Bell, Anthony et al., "The Title Says It All: A Title Term Weighting Strategy For eCommerce Ranking", submitted for review May 23, 2018 to ACM Conference on Information and Knowledge Management (CIKM '18), ACM, New York, NY, USA, 9 pages.

* cited by examiner

| Query | Scores | Titles |
|---|---|---|
| "Cheap Jewelry" | 100 | .5 carat princess cut diamond ring $900 |
| | -80 | .5 carat radiant cut diamond ring $800 |
| | ... | ... |
| | -100 | 2,000 leather ankle band |

COMPREHENSIVE SEARCH ENGINE SCORING AND MODELING OF USER RELEVANCE

BACKGROUND

Users typically input one or more search terms as a query within a field of a search engine in order to receive information particular to the query. For example, after launching a web browser, a user can provide search engine terms corresponding to a particular resource or topic and one or more servers hosting the search engine logic can obtain data from various remote data sources and cause a web page to display various ranked results associated with the particular resource or topic. The user may then select one or more of the various ranked result identifiers.

Search engine software typically matches terms in the query to terms as found within result candidate data sets and rank the results for display based on the matching. For example, some technical solutions employ term frequency-inverse document frequency (TF-IDF) algorithms. TF-IDF algorithms include numerical statistics that infer how important a query word or term is to a data set. "Term frequency" illustrates how frequently a term of a query occurs within a data set (e.g., a digital document, a blog post, a database, etc.), which is then divided by the data set length (i.e., the total quantity of terms in the data set). "Inverse document frequency" infers how important a term is by reducing the weights of frequently used or generic terms, such as "the" and "of," which may have a high count in a data set but have little importance for relevancy of a query. Accordingly, a query may include the terms "The different models of product X." These technologies may then rank a data set the highest because it includes the words "product X" with the highest frequency compared to other data sets.

BRIEF SUMMARY

Embodiments of the present disclosure generally include a non-transitory computer storage medium, a computer-implemented method, and a system. In one aspect, the non-transitory computer storage medium can store computer-useable instructions that, when used by one or more computing devices, cause the one or more computing devices to perform the following operations. One or more user selections associated with one or more identifiers can be received. A data structure can be incremented with one or more frequency statistics for one or more terms within the one or more identifiers. A plurality of vectors that are oriented in vector space according to context similarity between the plurality of vectors can be generated based at least on the one or more frequency statistics. The vector space can be for use in selecting one or more search result candidates in response to a query.

In another aspect, the computer-implemented method can include the following operations. A query for one or more resources can be received. A distance can be determined between one or more terms of the query and one or more tokens in vector space. The vector space can include a plurality of vectors that are oriented in the vector space according to context similarity between the plurality of vectors. One or more search result candidates can be scored based at least on the distance between the one or more terms of the query and the one or more tokens in vector space.

In yet another aspect, the system can include at least one computing device having at least one processor. The system can further include at least one computer readable storage medium having program instructions embodied therewith. The program instructions can be readable/executable by the at least one processor to cause the system to perform the following operations. A query for one or more resources can be received. One or more tokens associated with the query can be identified based on running the query through a learning model. The one or more tokens may correspond to one or more terms that the query shares context similarity to based on a history of user selections. One or more search result candidates can be scored based at least on the context similarity between the one or more tokens and the query.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

The present technology is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

Existing search engine software technologies include conventional functions that return results based on static rules or do not include comprehensive and tailored information particular to a set of users. For example, using TF-IDF-based technologies and other technologies, such as "Best Matching (BM) 25," existing search engines statically analyze the terms of the query itself against several data sets regardless of any search log history of a user and/or any past user selections. Although some existing search engine technologies go beyond the mere matching of terms in a query to terms in a target or candidate result set, such technologies fail to fully model a more complete spectrum of user perceived relevance. For example, some solutions may take into account a single or few behavioral signals, such as a past query or purchase of an item for ranking result candidates. However, other non-intuitive behavioral signals or factors are not analyzed. Further, current solutions fail to fully model user-perceived relevance by learning and predicting human perceived relevance based on each user's history of input selections.

Embodiments of the present disclosure improve the existing search engine software technologies by implementing new non-conventional functions or functionalities that offer users more relevant query results. Such new functionalities include storing user selection statistics (e.g., click frequency, purchase frequency, skip frequency, etc.) in a statistics data structure and generating a learning model (e.g., a word embedding vector model) based on the user selection statistics for use in executing queries for one or more resources. New functionalities that also improve existing search engine software technologies further include running a query through vector space (e.g., in a word embedding vector model) where each term or token in vector space is contextually similar such that when query results are returned they are scored based on contextual similarity scores, as described in more detail below.

Figure 1:
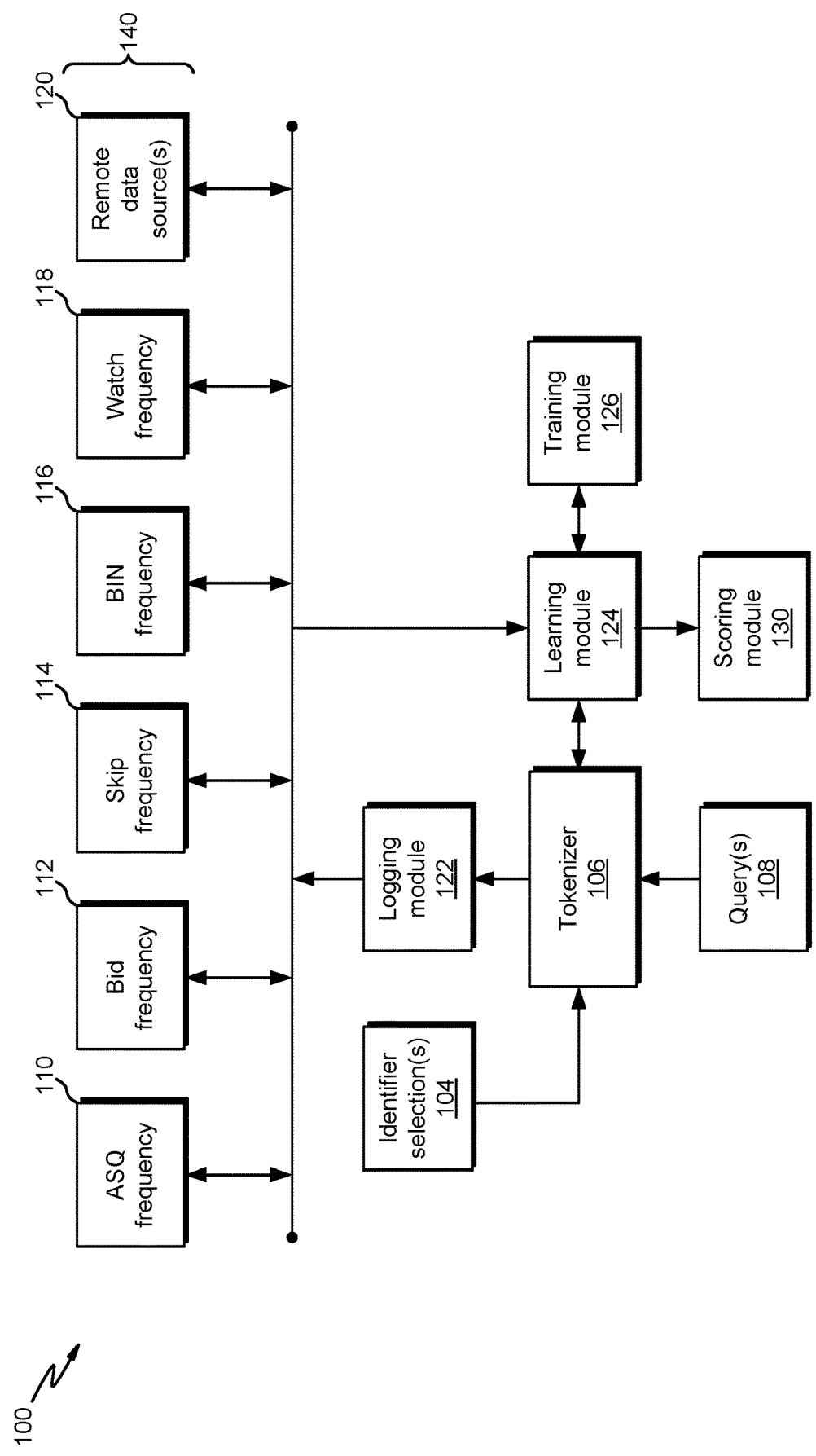
FIG. 1 is a block diagram of an illustrative system architecture in which some embodiments of the present technology may be employed, according to particular embodiments.

FIG. 1 is a block diagram of an illustrative system architecture 100 in which some embodiments of the present technology may be employed. Although the system 100 is illustrated as including specific component types associated with a particular quantity, it is understood that instead of or in addition other component types may exist at any particular quantity. For example, other user selections may be utilized instead of or in addition to the ASQs 110, bid frequency 112, skip frequency 114, bins 116, watches 118, and remote data source(s) 120, such as purchase frequency, selection of an item for placement in a shopping cart, etc. It is also understood that each component or module can be located on the same or different host computing devices. For example, in some embodiments, some or each of the components within the search engine system 100 are distributed across a cloud computing system.

The system 100 includes a plurality of user selections or signal statistics 140 that act as a set of inputs to the learning model(s) 124. The search engine system 100 includes the identifier selection(s) 104, the tokenizer 106, the logging module 122, the learning module 124, the training module 126, the scoring module 130, and the query(s) 108. The plurality of user selection statistics 140 includes the ASQ (Ask Seller a Question) frequency 110, bid frequency 112, skip frequency 114, BIN ("buy it now") frequency, watch (following an item through a bidding process) frequency, and statistics 120 based on information in one or more remote data sources, such as social media services, mobile devices, web-based search engines, consumer services (e.g., e-commerce-related sites), etc.

In some embodiments, the one or more identifier selections 104 act as an initial input to the search engine system 100. An "identifier selection" or selection of an identifier corresponds to a user-selected identifier (e.g., picture, symbol, button, alphanumeric text, etc.) that describes or is associated with an entity, such as a product or document for example. For example, within an e-commerce based portal, a user can select a product identifier that describes or represents a product for sale in order to place a bid on the product for sale. In another example, a user can select an identifier that corresponds to skipping an item for sale.

The tokenizer 106 receives the identifier selection(s) 104 and responsively generates or locates one or more tokens for the identifier selection(s) 104. A "token" as described herein is one or more values that describe or are associated with one or more terms in or associated with the item selection(s) 104. For example, an identifier can include or be associated with a title description "Green watch for sale-$90" and each of the words "green" "watch" "$90" can be identified as corresponding tokens for the title description.

In some embodiments, after the item selection(s) 104 is tokenized according to the tokenizer 106, the logging module 122 populates and/or looks up a statistics data structure based on a history of user selections associated with each of the tokens generated by the tokenizer 106. This history is illustrated by the user selection statistics 140. In an illustrative example, a user may bid on a particular phone model X within a portal by selecting a first button. The tokenizer 106 may then generate the tokens corresponding to "model X" "X" "gb" and "phone case." The logging module 122 may then populate or increment the "bid frequency" 112 statistic data structure portion (e.g., a column field) associated with some or each of the generated tokens because the user has selected the first button to bid on the particular phone model X.

The history of user selection statistics 140 include ASQ frequency 110, bid frequency 112, skip frequency 114, bin frequency, watch frequency, and statistics from one or more remote data sources 120. ASQs correspond to selections associated with asking a seller one or more questions about one or more items. For example, before purchasing an item a buyer may select an identifier (e.g., an icon) that responsively provides a field for a user to input a question about a particular product. This may facilitate a smooth bidding processes as buyers can obtain more information about a product before bidding on or purchasing a particular product. Accordingly, the logging module 122 may log each time a user makes such a selection to input a question about a product. In some embodiments, each string or character set (e.g., symbols or integers) are parsed from the input question the user asked and analyzed (e.g., via Natural Language Processing (NLP)) in order to identify what item to associate a statistic with and/or score relevancy for terms. For example, a user may input the question of "I'll only buy sunglasses with high definition lenses so which type of lenses do they have?" Some or each of these terms may then be parsed, analyzed, and put through the tokenizer 106 to be plotted within a statistics table.

NLP is a technique configured to analyze semantic and syntactic content of the unstructured data of the set of data. In certain embodiments, the NLP technique may be a software tool, widget, or other program configured to determine meaning behind the unstructured data. More particularly, the NLP technique can be configured to parse a semantic feature and a syntactic feature of the unstructured data. The NLP technique can be configured to recognize keywords, contextual information, and metadata tags associated with one or more portions of the set of data. In certain embodiments, the NLP technique can be configured to analyze summary information, keywords, figure captions, or text descriptions included in the set of data, and use syntactic and semantic elements present in this information to identify information used for dynamic user interfaces. The syntactic and semantic elements can include information such as word frequency, word meanings, text font, italics, hyperlinks, proper names, noun phrases, parts-of-speech, or the context of surrounding words. Other syntactic and semantic elements are also possible. Based on the analyzed metadata, contextual information, syntactic and semantic elements, and other data, the NLP technique can be configured to identify tokens for the tokenizer 106.

Bid frequency 112 in some embodiments includes a quantity of times one or more users have bid or made a selection to put or generate an offer on one or more items regardless of whether the one or more users have actually purchased such item. For example, if a first item is popular, it may be associated with a lot more bids than a second item, which can then be scored higher for query result sets. Skip frequency 114 in particular embodiments corresponds to a quantity of times one or more users have skipped or made selections to not purchase, disregard, or not bid on one or more items. For example, if various results are returned to a web results page and a user only selects one of the results, the logging module 122 may identify each result that was not selected an increment a statistics data structure according indicating that each of these items were not selected (e.g., via a negative integer score).

BIN frequency 116 may include a quantity of times one or more users have selected one or more identifiers to buy one or more items instead of bidding on the one or more items. In these embodiments, a selection is made to complete a purchase of an item. For example, a graphical user interface button may include the indicia "buy it now." In response to a user selection of this button, payment information may be requested from a user such that the user can buy the item immediately. Accordingly, each time a user selects the button, the logging module 122 may increment a statistics data structure indicating that one or more users have selected this particular button.

WATCH frequency 118 in some embodiments includes a quantity of times one or more users have selected one or more items to follow through a bidding process. For example, a user may have selected 30 items that he/she is interested in following through a bidding process without necessarily bidding or purchasing the items. Accordingly, each time a user selects an identifier to follow one or more items through a bidding process, the logging module 122 may update a statistics data structure accordingly.

In some embodiments, after the statistics have been plotted within a data structure by the logging module 122, the learning module 124 identifies patterns or associations of the generated tokens in order for the scoring module 130 to score and rank one or more tokens, search result candidates, and predict human perceived relevance for queries (e.g., the query 108). For example, in some embodiments a first set of scores can be generated for each of a plurality of generated tokens of identifier selections based on distance measures of a word embedding vector model, which is described in more detail below. A "word embedding vector model" as described herein maps data (e.g. the identifier selections 104/query 108) to or orients one or more points or vectors in vector space (e.g., real numbers in a 2D or 3D graph model) according to a context similarity to other data points or vectors in vector space. For example, a word embedding vector model in some embodiments includes a Word2Vec model. Word2vec is a two-layer network model that runs one or more input vectors (word representations) through a hidden layer (i.e., a column-row matrix) and a projection layer (e.g., a softmax classifier). Word2vec models predict target strings from source context words (i.e., via the Continuous Bag of Words (CBOW) algorithm) or inversely predicts source-context words from target words (i.e., via the skip-gram algorithm). The word embedding vector models with respect to some embodiments are described in more detail below.

It is understood that the learning module 124 of FIG. 1 can instead or additionally include other machine learning models. For example, in some embodiments, other neural network types or models may be utilized such as radial basis function neural networks, Kohonen self-organizing neural networks, linear regression, logistic regression, naïve Bayes, decision trees, etc.

In some embodiments, after the statistics 140 have been logged to one or more data structures and run through the learning module 124, a user may issue the query 108. The tokenizer 106 may then identify one or more terms associated with the query 108 and/or run tokens through the learning module 124. These "token" values may include a representation of a word, such as a real number or other symbolic representation of an English word. For example, a user may have input the query "sunglasses." The tokens generated for this query, when run through the learning module 124, may include a first vector of real numbers that represent the string "frame" (first token), a second vector of real numbers that represent the string "case" (second token), a third vector of real numbers that represent the string "lens type" (third token), and a fourth vector of real numbers that represent the string "sunglasses" (fourth token). Accordingly, in some embodiments, the tokens generated for the query 108 are associated with terms that were not in the original query 108, but which are contextually related, which is described in more detail below.

In some embodiments, the learning module 124 additionally or alternatively identifies other patterns and scores accordingly, such as identifying that it is a particular month (e.g., December) and that a particular item is sold in the particular month (e.g., tree ornaments). Accordingly, the scoring module 130 may score query tokens or result candidates higher based on this determination. The training module 126 is configured to receive input data points and include initial training phases in order to make predictions or classifications more robust. For example, according to the illustration above, in order to fully hypothesize or predict that the particular item is always associated with a particular month, the learning module 124 may have to analyze several years or iterations of data to make this inference strong over a threshold, as opposed to only analyzing one year. In another example, in order to make the distances in word embedding vector space definitive, word embedding vector models may need to be trained as described in more detail below.

In some embodiments, the learning module 124 identifies patterns or associations based on the frequency of user selections indicated by the statistics 140 (and/or other statistics) in a data structure and provides an associated output. Each token of the plurality of tokens is scored higher than other tokens if it includes a higher frequency of a particular user selection compared to other tokens. For example, using the illustration above, "brand X" may have received 100 bin selections, whereas "brand Y" may have only received 50 bin selections. Accordingly, brand X may be scored higher by the scoring module 130. Some or each of these scores and/or statistics (e.g., 140) may be reflected within the learning model 124. Accordingly, a particular token of the plurality of tokens can be scored higher than other tokens the closer the token is to a query term in vector space of a word embedding vector model. For example, if the query includes the term "toy cars" and the token "brand X" is closer to "car" than "brand Y," brand X is scored higher than brand Y by the scoring module 130. According to the illustration above, brand X is scored higher and is closer because it received 100 bin selections as opposed to only 50 bin selections associated with brand Y. In other words, the output of the learning model 124 can be directly related to receiving the input of the statistics 140.

The scoring module 130 scores each token term and/or each search result candidate for the query 108. A "search result candidate" includes one or more identifiers that are candidates for being provided as a query result set and that describes or is associated with one or more resources, such as products for sale, documents, web pages, links, etc. For example, a search result candidate can correspond to a product title of a product for sale (e.g., "$20-green toy car"), a document (e.g., a particular PDF document), a web page, a link (e.g., a URL link to one or more images), and/or any other identifier corresponding to content that can be returned in a result set of a query.

In an illustrative example of scoring by the scoring module 130, according to the illustration above, the user's query of "sunglasses" may be tokenized with terms and scores, such as "frame" +50, "case" −20, and "polarized lenses +10." These individual scores may reflect distances within a word embedding vector model and/or logged user selection statistics as described above. The scoring module 130 can then search within a data store, such as a database of available search result identifiers and score search result identifier product titles based on the individual token scores above. In some embodiments, the score for each search result candidate is calculated based on adding and/or subtracting each token score as it occurs in a particular search result candidate. For example, a first search result candidate may read "New sunglasses case for polarized lenses—$20". Accordingly, the integers −20 (frame) and 10 (polarized lenses) are added together to arrive at a final score of −10. In another example, a second search result candidate may read "New OAKLEY sunglasses, frames and lenses included—$300." Accordingly, the integers +50 (frame)+10 (polarized lens) are added to arrive at a final score of 60. Therefore, when a result set of search result identifiers are provided by a client application, such as a web browser, the particular orientation, order, or existence of the search result identifiers may be based on the final score. For example, because the second search result candidate has a score that is larger than the first search result candidate, it may be located closer to the top of a results page than the first search result candidate. In some embodiments, search result identifiers are additionally run through a learning model (e.g., learning model 124), such that tokens are not only matched to exact words in a search result identifier, but semantically similar words to the search result identifier. This is described in more detail below.

Figure 2:
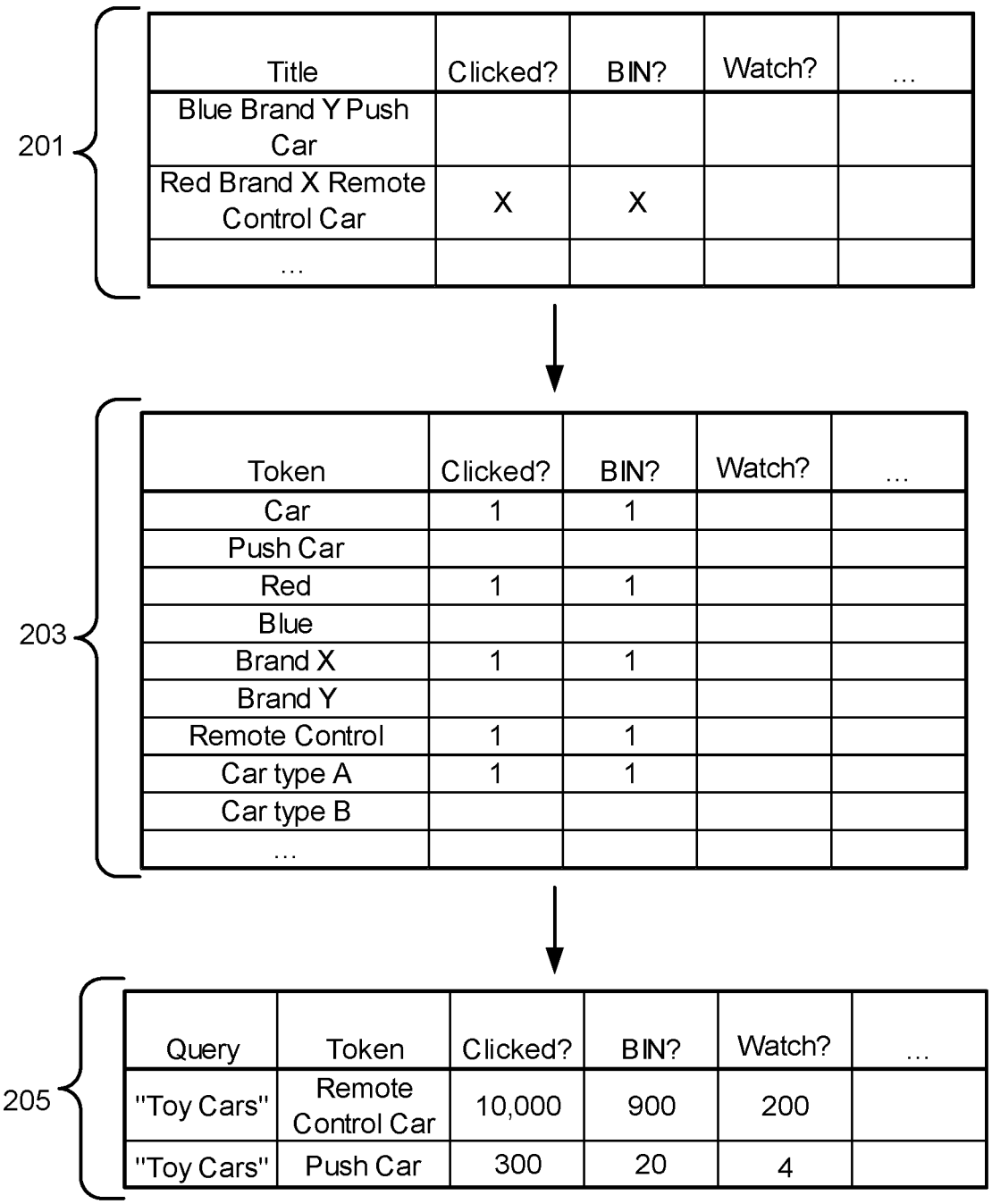
FIG. 2 is a schematic diagram of an example statistics data structures that illustrate how behavioral statistics are generated for scoring tokens, according to some embodiments

FIG. 2 is a schematic diagram of an example statistics data structures that illustrate how behavioral statistics are generated for scoring tokens, according to some embodiments. FIG. 2 includes a plurality of attributes or columns that identify a corresponding user selection type (e.g., "clicked?"). The plurality of attributes are populated with values based on a selection type associated with one or more user selections. In some embodiments, FIG. 2 represent some or each of the statistics 140 that the logging module 122 of FIG. 1 generates or identifies. Although FIG. 2 illustrates that particular identifier selections can be tokenized and then statistics are responsively generated, in some embodiments, user queries, such as the query 108, are tokenized with statistics instead of or in addition to the identifier selections. It is also understood that although FIG. 2 illustrates particular values (e.g., "Red remote control brand X car") and attributes (e.g., "Bin?" "Watch"?), these are representative only. As such, different values and attributes may instead or additionally be included. For example, in some embodiments, each of the tables in FIG. 2 include an "ASQ" frequency field, a "bid frequency" field, etc.

The statistics table 201 includes at least two rows corresponding to at least two different identifiers, which describe two products that are for sale. The statistics table 301 may further include at least four attributes or columns. The first column "title" includes identifiers associated with products for sale. The second column "clicked?" is incremented if a user selects an identifier (e.g., button, symbol, link, etc.) associated with the particular product. The third column "BIN?" is incremented if a user selects an identifier associated with immediately buying a product without bidding. The fourth column "Watch" is incremented if a user selects an identifier to follow the associated product throughout a bidding process.

The first product for sale is associated with a first identifier that reads "Blue brand Y push car." The second product for sale is associated with a second identifier that reads "Red remote control brand X car." In an illustrative example, a user may have selected the second identifier "Red remote control brand X car" (or other identifier associated with the second identifier, such as a button) in order to immediately buy the product associated with the second identifier, as opposed to bidding on the product. Responsively, statistics are incremented within the statistics table 301 indicating that the identifier "Red remote control brand X car" was associated with the particular user selection attributes of "clicked?" and "BIN?," as opposed to "Watch," as the user may not have selected any identifier associated with a bidding process for the product.

The statistics table 203 illustrates various tokens of the title identifiers in table 201 being incremented with statistics. Accordingly, in some embodiments, the statistics table 203 represents a statistics table generated in response to the generating of statistics as illustrated in the table 201. In response to the selection indicated in table 201 that a user has selected an item identifier in order to immediately buy an associated product, values within the statistics table 203 can be generated. Specifically, in response to the selection indicated in table 201, each term in the identifier "Red remote control brand X car" can be parsed, extracted, identified, and/or copied to the "token" attribute of table 203

(e.g., via the tokenizer 106 of FIG. 1). Because the user made a selection associated with a "click" and "BIN" according to the table 201, each of these attributes are incremented by a value of one for each token term found within the identifier "Red remote control brand X car." Accordingly, the terms "car" "red" "brand X" "remote control" and "car type A" are each incremented by one to the clicked and BIN fields. Further, the other tokens of "push car" "blue" "brand Y" "car type B" are not incremented as illustrated in the table 203 because the user did not select the identifier "Blue brand Y push car" or other identifiers as indicated in the table 201. Further, the "watch?" attribute is not incremented for any record or token because the user selection as illustrated in the table 301 was not indicative of a WATCH or following an item through a bidding process.

After the tokens are generated and incremented with statistics according to the table 203, they can be responsively aggregated or consolidated with a history of user selections, as indicated in the table 205. For example, after the "remote control" token has been incremented by 1 for the "clicked?" and "BIN?" fields of the table 203, it can be added to the "clicked?" and "BIN?" fields for the token "remote control car" within the table 205. Therefore, for example, the "clicked?" field value for the token "remote control car" within the table 205 may change from 9,999 to 10,000 in response to the incrementing of the "clicked?" field of table 203. Although the table 205 illustrates only two records or tokens, "remote control car" and "push car," it is understood that more or less tokens or records can be included, such as each of the tokens as illustrated in FIG. 203. In some embodiments, each of the user selections represent a history of user selections associated with only a particular user. In some embodiments, however, each of the user selections represent a history of user selection of a plurality of users, such as all consumers within an e-commerce-based portal.

The table 205 illustrates that there have been many more user selections associated with the token "remote control car" compared to "push car." Accordingly, in some embodiments, in response to the table 205 being populated at a first time, and a query (e.g., "Toy cars") being issued at a second time (which is subsequent to the first time), a scoring module (e.g., the scoring module 130) may score "remote control car" higher than "push car" when scoring individual tokens and/or search result candidates for the particular query issued. In some embodiments, the output in the table 205 is the input for a learning model (e.g., learning model 124), such as determining distances between queries and/or identifiers and other terms. For example, because "remote control car" has 10,000 clicks and "push car" only has 300 clicks, remote control car can be closer to the query "toy car" in vector space, as discussed in more detail below.

Figure 3:
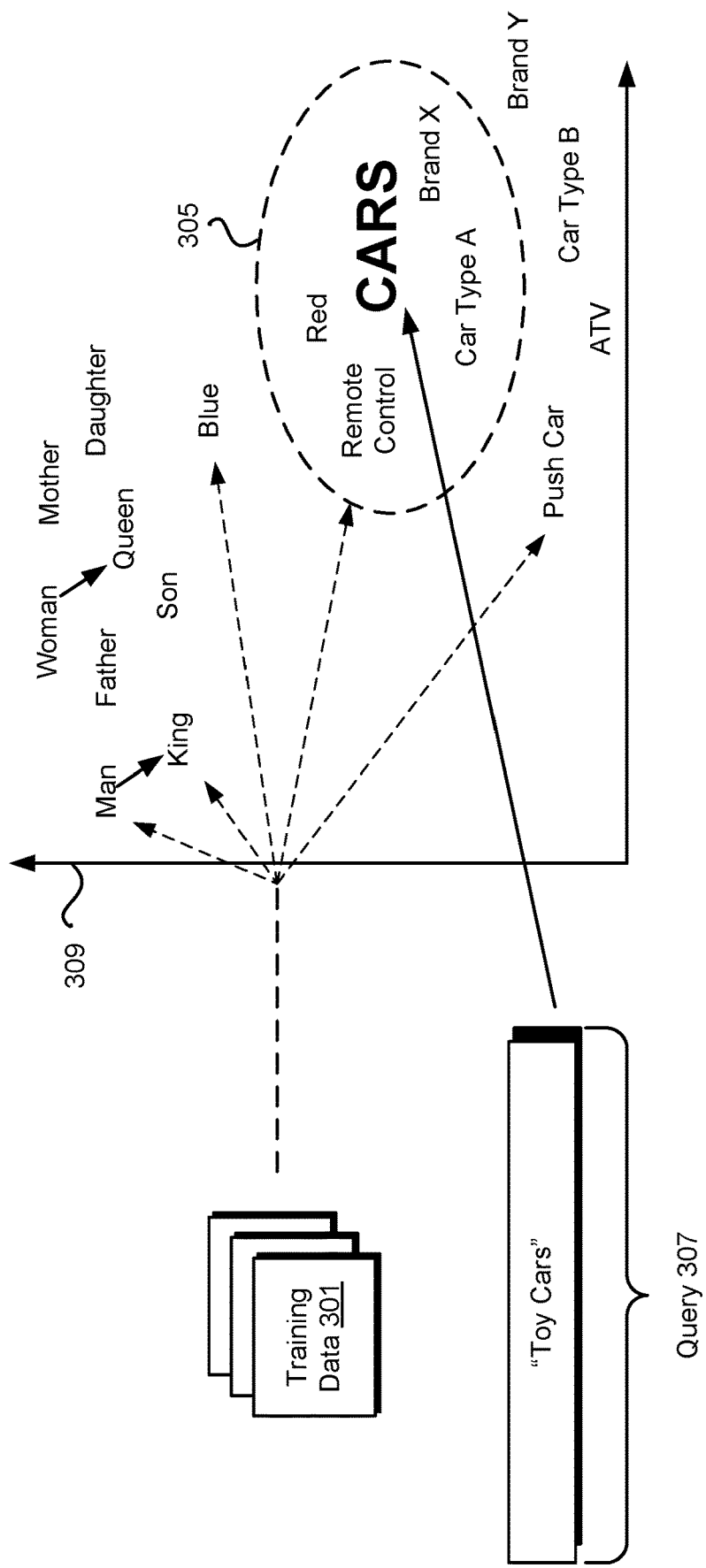
FIG. 3 is a schematic diagram illustrating how query terms or item selections are run through a word embedding vector model, according to some embodiments.

FIG. 3 is a schematic diagram illustrating how query terms or item selections are run through a word embedding vector model, according to some embodiments. In some embodiments, FIG. 3 represents or is included in the learning module 124 of FIG. 1. FIG. 3 includes the training data 301, the query 307, and the vector space 309. The vector space 309 includes multiple vectors (e.g., man, king). It is understood that although the vector space 309 is a representation with particular vectors and dimensions, more or less vectors and dimensions can be present with different, more, or fewer string representations. It is also understood that although the vector space 309 includes data points in string form (e.g., Man), in some embodiments, such as in Word2vec models, the data points are number representations (e.g., real number vector(s)). In some embodiments, a "String representation" or any other query representation is a first set of data that has the same meaning, stands for, and/or is substituted for a second set of data but does not have the same exact value or format as the second set of data. For example, "Woman" can be a string and "0" could be its string representation. In other embodiments, a string representation or any other representation is the original data point itself. For example, "Woman" can be the original data point and "Woman" can also be the "string representation."

In order to plot data points or string representations, query terms, or item selections within the vector space 309, the model is trained using the training data 301 (e.g., via the training module 126). In various embodiments, the training data 301 includes a large corpus of unstructured data (e.g., documents, news articles, social media posts, news feeds, blogs) and/or structured data (e.g., database values). The training data 301 is also an input of the word embedding vector model. The training data 301 includes some or each of the words as found within the vector space 309—man, king, father, son, woman, queen, mother, daughter, blue, remote control, red, cars, brand x, car type A, brand y, push car, ATV, and car type B.

In some embodiments, the vector space 309 represents a "pre-trained" embedding. A pre-trained embedding is a static model that is generated without feedback, retraining, or reference to the data sets being fed through it. For example, a user may download a static word embedding vector model from an online source, which is already trained and includes the vectors or data points already mapped in vector space according to semantic similarity between words. In other embodiments, the vector space 309 represents a "retrained" or trained embedding. A retrained or trained word embedding model is an embedding that receives training feedback after it has received initial training session(s) and is optimized or generated for a specific data set (e.g. scoring one or more tokens, etc.) For example, after initial data points are plotted to the one or more word embedding vector model, the system can "re-train" the word embedding vector model(s) a second time so that any vectors or words (e.g., CARS) in a future data set are consistently mapped to its closest neighbor (e.g., "brand X") or other word according to the policy implemented. In some embodiments, retraining includes issuing feedback to make sure the correct data point pairing (e.g., "CARS" and "brand X") is utilized.

In order to map each of the words to its contextually appropriate points in the vector space 309, training algorithms are utilized. For example, in some embodiments, the word embedding vector model is trained using the maximum likelihood (ML) principle to maximize probability of the next word $w_t$ (i.e., "target") given the previous words h (i.e., "history") in terms of a softmax function:

$$P(w_t \mid h) = \qquad \qquad \text{Equation 1}$$
$$softmax(score(w_t, h)) = \frac{\exp\{score(w_t, h)\}}{\sum \text{word } w' \text{ in } Vocab^{\exp\{score(w',h)\}}}$$

Where score ($w_t$, h) computes the compatibility of word $w_t$ with the context h. The model is trained by maximizing its log-likelihood on the training set, that is maximizing $$J_{ML} = \log P(w_t \mid h) \qquad \qquad \text{Equation 2}$$
$$= score(w_t, h) - \log$$

$$\left(\frac{\exp\{\text{score}(w', h)\}}{\sum \text{Word } w' \text{ in } Vocab}\right)$$

This yields a properly normalized probabilistic model for language modeling. Each probability is computed and normalized using the score for all other words w' in the current context h at every training step. In some embodiments, some models, such as word2vec, are trained using a binary classification objective, such as logistic regression, to discriminate the real target words $w_t$ from K noise words w", in the same context. Accordingly, instead of a softmax classifier, a noise classifier is used.

The output of the training algorithms and/or actual data input is each of the positional words in the vector space 309, which shows groupings of words that are semantically similar. "Semantic similarity" is the semantic distance between two or more concepts (e.g., tokens) according to a given ontology. An "ontology" is a class or data set that includes a set of attributes (e.g., words). For example, the tokens of man, king, father, son, woman, queen, mother daughter may belong to an ontology of "human titles." The "distance" between any two or more words in some embodiments is based on the similarity of their meaning and/or semantic content, as opposed to any syntax similarity, such as string format. For example, "car" and "far" are syntactically similar but have two different definitions so they are not semantically similar.

In some embodiments, the output as represented in the vector space 309 is plotted in response to the word embedding vector model receiving and plotting points associated with the table 205 of FIG. 2. For example, responsive to the word embedding vector model being fed the data that the "remote control car" was associated with a total of 11,100 user selections (and/or a frequency of selections for only particular attributes (e.g., 10,000) and not other attributes) and that the "push car" was only associated with a total of 324 user selections, the token "remote control" may proportionately be closer to the term "CARS" than the token "push car" as represented within the vector space 309. Accordingly, during a training session associated with the training data 301, the word "CAR" may be run through the word embedding vector model and an output may be responsively generated similar to the vector space 309. In some embodiments, the distance between two or more vectors is directly proportional to the difference in statistics frequency of user selection statistics. For example, as illustrated above, the distances between "push car" and "remote control" (and/or CARS) may be reflected in the vector space 309 based on the exact frequency difference between 11,100 and 324, which is 10,776. However, if the "push car" was associated with even fewer user selections, such as 50 (instead of 324), the difference is greater (11,050), causing the distance between the two vectors to be even greater. Accordingly, for example, the location of "push car" in the vector space 309 may instead be lower to the X-axis line of the vector space 309. Although descriptions corresponding to "remote control" and "push car" have been illustrated above, it is understood that the vector space 309 in some embodiments includes vectors or tokens in its particular orientations based on any of the terms associated with FIG. 2.

The distance between any two vectors or words are measured according to any suitable method. For example, in some embodiments, automated cosine similarity is used to compute distance. Cosine similarity is a measure of similarity between two non-zero vectors of an inner product space that measures the cosine of the angle between the two non-zero vectors. No similarity is expressed as a 90 degree angle, while total similarity (i.e., the same word) of 1 is a 0 degree angle. For example, a 0.98 distance between two words reflects a very high semantic similarity while a 0.003 distance reflects little semantic similarity. As illustrated in the vector space 209, the cosine similarity between "man" and "king" and "woman" and "queen" are the same cosine distance, thus king in certain situations is semantically similar to queen given the inputs of man and woman. In some embodiments, the distance is represented as an average distance or the distance between a particular token in vector space 309 and an average of query terms. In some embodiments, the distance is represented via fuzzy matching, or the distance of closest token to a query term.

After the training data 301 (e.g., data from the table 205 of FIG. 2) is run through the training algorithm and represented as the vector space 309, the query 307 "Toy Cars" and/or individual terms of the query 307 are run through the word embedding vector model and plotted or located in the vector space 309. For example, as illustrated in FIG. 3, the query term "CARS" is extracted or copied from the query 307 "toy cars" and placed/found in the vector space 309 according to the ontology it belongs to and/or its semantic similarity to other words or data points. In some embodiments, the entire query 307 is placed in vector space 309 such that no extraction of only the word "CARS" occurs. After the placing or finding of the term "CARS" in vector space, "CARS" distance to other words or vectors can then be computed in an automated fashion in word embedding vector models, which is used to help score individual tokens and/or search result candidates as described above. As illustrated in the vector space 309, "CARS" closest neighbor in terms of distance is "Brand X," which is closer than "Brand Y." Accordingly, when queries or item identifiers include a value of "CARS" or "TOY CARS," a plurality of tokens can be generated based on the distance of CARS to other words, such as "Red" "Remote Control" "Car Type A," and "Brand X." In some embodiments, the scores and/or result sets are directly related to the distance of a query term to other words in vector space. For example, the word "brand X" may be scored highest since it is the closest term to the query term CARS and "man" may be scored lowest since it is the furthest always from the query term "CARS."

The distance threshold 305 illustrates scoring thresholds, statistics generation thresholds, and/or result candidate thresholds. The threshold 305 may correspond to a threshold distance each word may be from the query term "CARS" in order for the system to score and/or provide results. For example, man and king may be too far for the system to score those tokens for search result candidates. Although the distance threshold 305 is illustrated as encompassing only a few select set of words, it is understood that it can encompass any quantity of terms associated with any particular distance. For example, the distance threshold 305 can instead surround "blue" "red" "CARS" "remote control" "brand x" "car type A" "Brand y" "push car" "ATV" and "car type B," such that only "man" "king" "father" "son" "woman" "queen" "mother," and "daughter" are the only terms not scored.

In some embodiments, FIG. 3 represents or includes a word-category co-occurrence matrix (e.g., a compilation of vector spaces). A matrix includes one or more vectors of a first vector space multiplied by one or more vectors of a second vector space. This allows rows within the vector space to be normalized for summing to 1 to become a probability distribution. Words or vectors can be compared using their category distribution. In an example of a category distribution, the query term "OAKLEYS" may include a plurality of vectors in a first vector space that includes each word that is categorically associated with OAKLEYS, such as "snow pants & bibs," "tactical footwear," and "other men's eyewear," and the phrase "other men's eyewear" may be the closest categorical distance to "OAKLEYS." In an illustrative example of word (not category) distribution, the same query term "OAKLEYS" may include a second plurality of vectors in a second vector space that includes each word that is associated with OAKLEYS, such as "polarized" "case" "lenses" "frame" "NIKE" "jacket" "boot" "sunglasses" and "OAKLEY." In this example, the closest distance vector may be "OAKLEY" and "sunglasses." The category distribution and the word distribution can then be linearly combined in a single vector space or matrix to indicate which categories and particular word tokens are closest to the query term.

Figure 4:
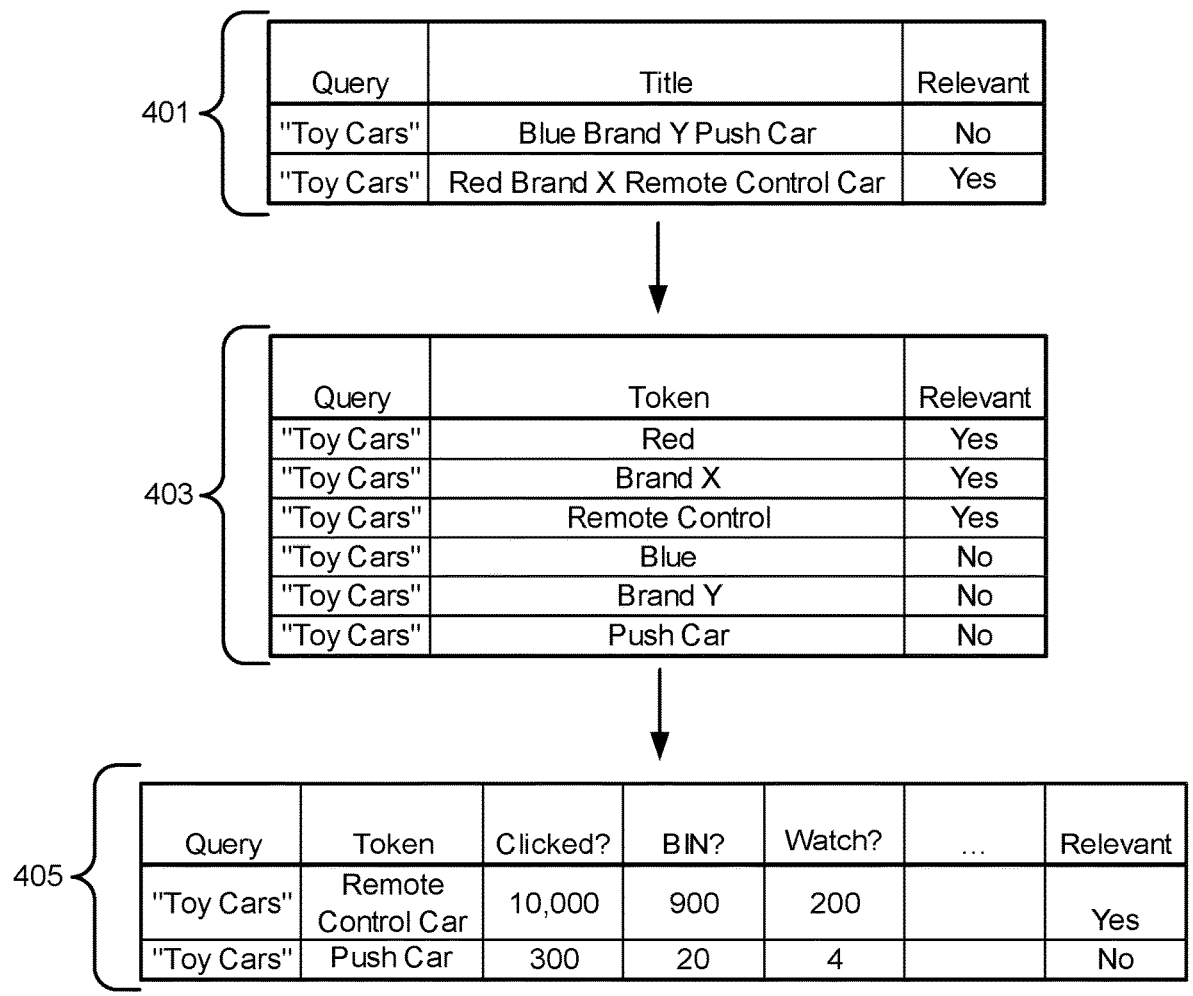
FIG. 4 is a schematic diagram illustrating various statistics data structures that show how behavioral statistics are generated for scoring relevance, according to some embodiments.

FIG. 4 is a schematic diagram illustrating various statistics data structures that show how behavioral statistics are generated for scoring relevance, according to some embodiments. FIG. 4 illustrates that an attribute of "relevant" can be included for labeled query-title pairs and query-token data sets. This can be utilized for determining relevance scores for one or more search result candidates.

The table 401 includes multiple queries, titles or entity identifiers (e.g., product search result candidates) associated with a corresponding query, and whether a particular entity identifier is relevant for a given query. In some embodiments, an identifier is relevant if a threshold quantity or percentage (e.g., more than half) of the identifier's individual tokens or terms are relevant. An individual token of a query may be relevant if it matches or is the same as any term of an entity identifier, and/or is within a distance of a query term of a word embedding vector model. For example, a user may have issued the query "toy cars" and responsively according to the vectors space 209, each of the vectors within the threshold 205 may be considered relevant because of the distance and/or the statistics generated for associated selections. Accordingly, as illustrated in the table 403, each token of "red," "brand X," and "remote control" is marked as relevant. In some embodiments, after the individual tokens are flagged as relevant (and/or not relevant) according to the table 403, the individual titles or search result candidates can be flagged as relevant or not relevant. For example, according to the table 401, because most or all of the title "red brand x remote control" matches most or all of the relevant individual tokens as laid out in the table 403, it is set as relevant, as opposed to the title "Blue brand Y push car," which does not have a single token marked as relevant in the table 404. Therefore, the title "Blue brand Y push car" is set to not relevant. Because the title "Red brand X remote control" is set to relevant and the title "Blue brand Y push car" is not set to relevant, the title may be scored higher as indicated in a search result page (e.g., placing it at the top of the results instead of the bottom).

The table 405 in some embodiments, represents the table 205 with an additional relevance field. The table 405 may be utilized to further refine search results other than a broad cardinality indication of whether an identifier is relevant or not. For example, depending on particular difference in statistics between tokens, the ranking for individual search result candidates may be different. In an illustrative example, referring back to FIG. 2 and the table 205, a search result candidate with the words "remote control car" may be ranked highest followed by identifier candidates with the words "push car" in it due to the selection frequencies. However, if another token (e.g., "brand X") was associated with 20,000 selections per attribute, identifier candidates may be ranked highest above the identifier candidates that include "remote control car."

Figures 5A, 5B:
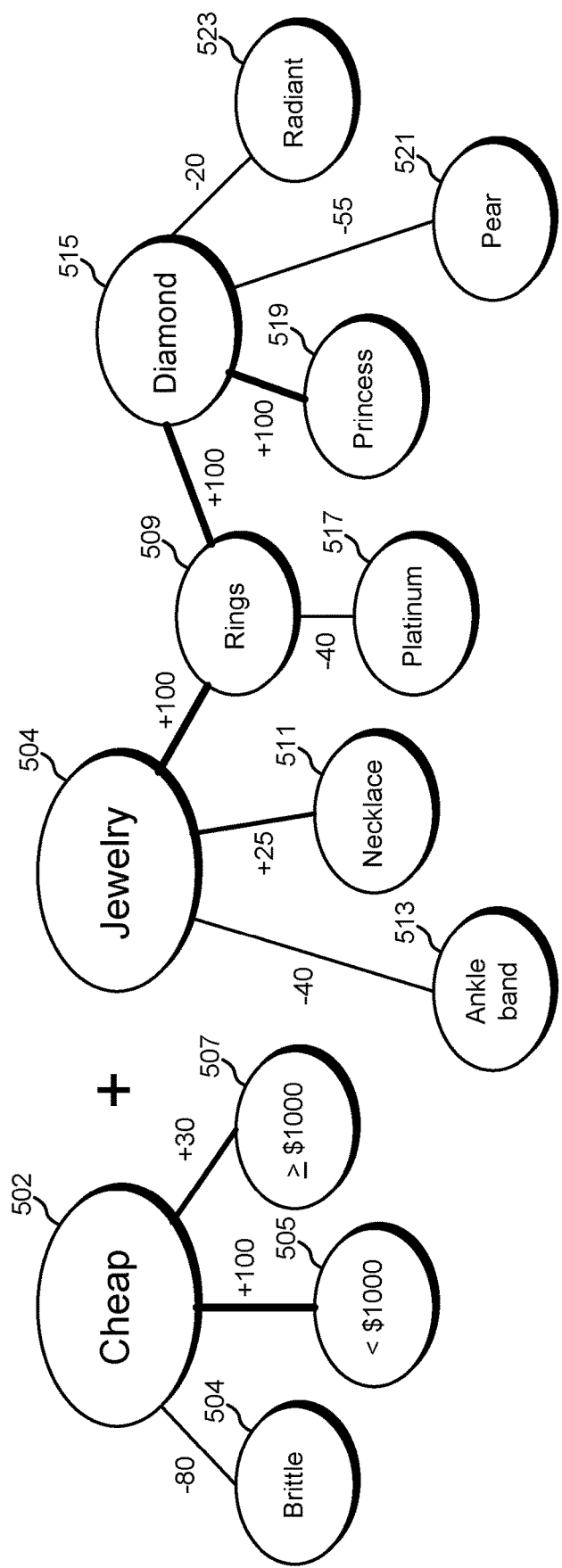
FIG. 5A is a schematic diagram illustrating how individual tokens are scored, according to particular embodiments.
FIG. 5B is a schematic diagram illustrating how search result candidates are scored based on individual token scores, according to various embodiments.

FIG. 5A is a schematic diagram illustrating how individual tokens are scored, according to particular embodiments. In some embodiments, FIG. 5A represents a data structure, such as a tree data structure. For example, FIG. 5A can include individual vertices or nodes (e.g., a "brittle" node 504) linked by one or more edges (straight lines), which are associated with token scores (e.g., −80). A user, for example, issues the query "cheap jewelry." The query can be run through a learning model, such as the word embedding vector model of FIG. 2, to generate corresponding tokens. Each of the tokens can be represented by the nodes. For example, for the term "cheap," individual tokens of "brittle" "<1000" and "≥1000" may be generated as indicated within the nodes. A first quantity of user selections may indicate that the node 505 token is associated with the largest quantity of user selections and/or is the closest distance to a query or query term "cheap." Accordingly, the score of +100 (the highest score) is generated for the relationship between the node 502 and 505. Likewise, the node 507 token may be associated with a second quantity of user selections and/or is a particular distance to query or term "cheap." Accordingly, the score of +30 is generated for the relationship between nodes 507 and 502. Further, a third quantity of user selections may indicate that the node 504 token is the farther away in distance to the other nodes and/or includes the lowest quantity of user selections. Accordingly, the score of −80 may be set for the association between node 504 and node 502.

The process identified above is repeated for the query term "jewelry." Accordingly, for the jewelry node 504, each of the token nodes 513, 511, 509, 517, 515, 519, 521, and 523 are generated and the relationships or individual tokens are scored. FIG. 5A indicates that princess diamond cut rings are associated with the highest scores, as illustrated by the scores between the "princess" node 519, "diamond" node 515, and the "rings" node 509. In an illustrative example, various user selections (e.g., clicks, ASQs, BINS, watches, etc.) associated with entity identifiers (e.g., products) may have recently been directed mostly to princess cut diamond rings under $1000, as opposed to necklaces, ankle bands, and/or any other article of jewelry. The particular quantity of user selections may be reflected in a statistics table (e.g., the statistics table 205 of FIG. 2), a word embedding vector model, and/or the data structure represented in FIG. 5A such that the individual scores in FIG. 5A are responsively generated.

The scores indicated in FIG. 5A (and 5B) illustrate specific integer values according to one or more scoring algorithms. For example, a score of +100 can be given for a token if it is above a threshold quantity selection (e.g., 100 selections) and/or within a distance threshold as represented in vector space. Each score may be associated with other thresholds. For example, a quantity of user selections between 80 and 100 can receive a score of 100. A second quantity of user selections between 60 and 79 can receive a score of 80, etc. Likewise, a negative score can be given for a token if it is below a threshold quantity selection (e.g., 20 selections) and/or outside of a distance threshold. However, it is understood that the score values and score distribution differences between the nodes are representative only and other scoring mechanisms can be utilized instead of or alternatively. For example, in some embodiments, a score can be represented as one or more float values in a range between 0 and 1, with 1 being the highest ranked and 0 being the lowest rank.

FIG. 5B is a schematic diagram illustrating how search result candidates are scored based on individual token scores, according to particular embodiments. FIG. 5B illustrates that for the query "cheap jewelry" particular search result candidates are scored and ranked. For example, the title "0.5 carrot princess cut diamond ring $900" is scored the highest at +100 because of the individual token scores indicated in FIG. 5A. In some embodiments, the scores illustrated in FIG. 5B are a cumulative score of individual scores of tokens. For example, in some embodiments, for the title "0.5 carrot princess cut diamond ring $900", the final score includes summing the princess node 519 (100) with the diamond node 515 (100) with the ring node 509 (100) and the <$1000 node 505 (100) to arrive at a final score of 400 (100+100+100+100) instead of +100 as indicated. In these and other embodiments, each term in a search result candidate is identified and matched to a corresponding token (e.g., as found within a tree data structure, which FIG. 5A can represent) in order to generate the final scores and generate results.

FIG. 5B further illustrates that the search result candidate "0.5 carrot radiant cut diamond ring $800" is associated with the second highest score of +80. This identifier may be ranked lower than the identifier above it because the individual token score of the "radiant" node 523 is scored lower (−20) than the princess node 519 (+100), even though the other terms in the result identifier candidates remain the same or are similar. FIG. 5B illustrates that the search result candidate "$2,000 leather ankle band" is scored the lowest at −100. As illustrated in FIG. 5A, the node 513 is the lowest scored immediate child node of jewelry 504 at a score of −40, which along with the fact that the price is greater than or equal to $1000 (node 507), causes the final score of −100 to be associated with the search result candidate. In some embodiments, the titles and associated scores as illustrated in FIG. 5B are utilized for ranking and outputting search results for display. For example, one or more servers can cause a web browser to render the titles or other result identifier candidates in a particular orientation according to score, such as the highest scored title at the top and the lowest scored title at the bottom, as illustrated in FIG. 5B.

Figure 6:
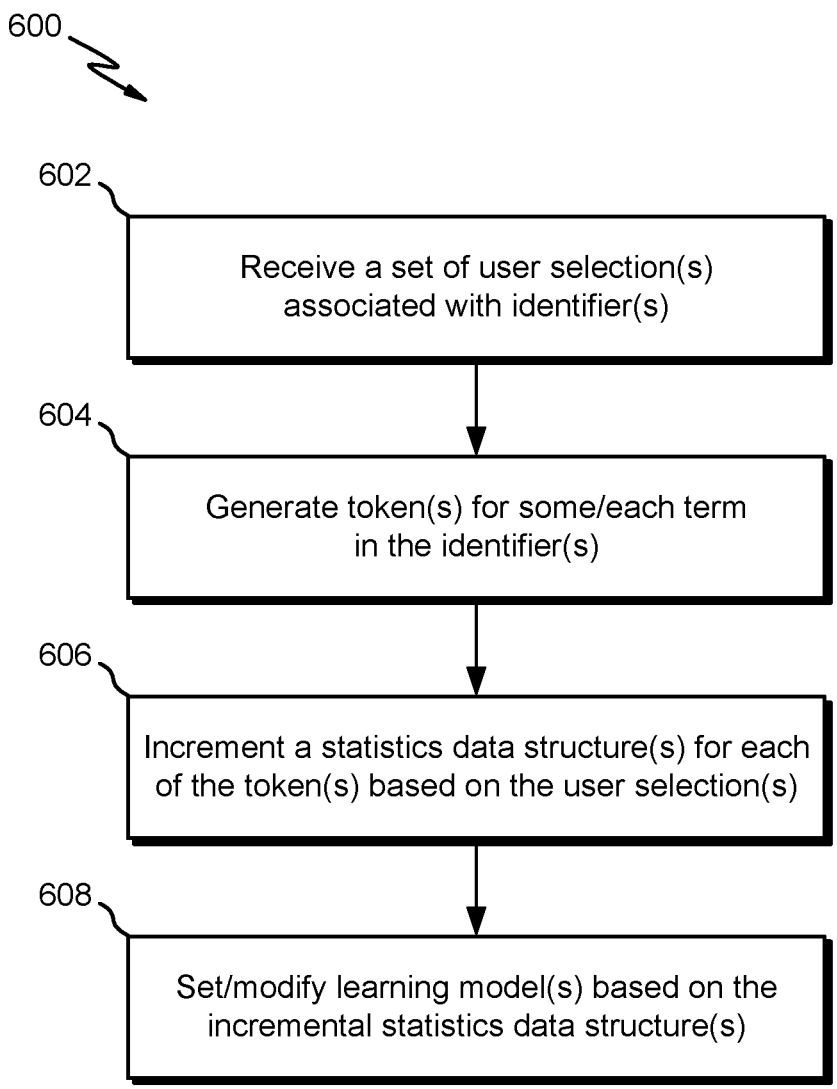
FIG. 6 is a flow diagram of an example process for setting one or more learning models based on statistical data input, according to particular embodiments.

FIG. 6 is a flow diagram of an example process 600 for setting one or more learning models based on statistical data input, according to particular embodiments. The process 600 (and/or processes 700, 800) may be performed by processing logic that comprises hardware (e.g., circuitry, dedicated logic, programmable logic, microcode, etc.), software (e.g., instructions run on a processor to perform hardware simulation), firmware, or a combination thereof.

Per block 602, a set of one or more user selections associated with one or more identifiers are received (e.g., by the tokenizer 106 of FIG. 1). For example, a user may select a first button associated with a first identifier or one or more products for sale (e.g., X brand shoes) in order to ask a question to a seller (e.g., an ASQ). In response to this selection of the first button and in some embodiments, data can be scraped from one or more web or app pages that the user made the selection on and transmitted to a system (e.g., the search engine system 102). Scraping in some embodiments includes using an automated bot or web crawler to parse a document (e.g., an HTML webpage doc.) to determine what data is located in the document. Accordingly, data can be scraped as a background task without a specific user request. Data may be need to be scraped in order to determine what statistic attribute (e.g., "BIN?" field of table 201 of FIG. 2) to populate for a given selection. According to the illustration above for example, the first identifier (e.g., X brand shoes) may be scraped from the one or more app or web pages that the user is engaged with and transmitted to the tokenizer 106, which may in some aspects be represented by the table 201 of FIG. 2.

Per block 604, one or more tokens are generated (e.g., by the tokenizer 106) for some or each term in the one or more identifiers. For example, according to the illustration above, the first identifier of "X brand shoes" can be parsed into two tokens "X" and "shoes." Per block 606, one or more statistics data structures for each of the one or more tokens can be incremented based on the one or more user selections. For example using the illustration above and the statistics table 203 of FIG. 2, each of the tokens "X" and "shoes" can be populated under the "token" attribute of the table 203 as separate individual records or rows. The table 203 may include an additional "ASQ?" field. Accordingly, because the user has selected an ASQ button, which was associated with the first identifier, the "ASQ?" field is incremented by one for the "X" and "shoes" records.

Per block 608, one or more learning models can be set or modified based on the incremented one or more statistics tables. In some embodiments, a plurality of vectors can be generated based at on one or more frequency statistics. The plurality of vectors can be oriented in vector space according to context similarity between the plurality of vectors. The vector space may be for use in selecting one or more search result candidates in response to a query. In some embodiments, vector space can be generated with one or more tokens within a word embedding vector model based on the incremented statistics data structure. In an illustrative example of block 608, referring back to FIG. 2 and FIG. 3, the information in the table 205 of FIG. 2, such as individual tokens and selection frequencies of the tokens can be input into the word embedding vector model of FIG. 3 and trained such that distances between two or more vectors or tokens can be determined. Accordingly, the one or more learning models are configured to receive one or more queries and associate one or more terms of the queries with the tokens that have already been inputted into the one or more learning models.

Figure 7:
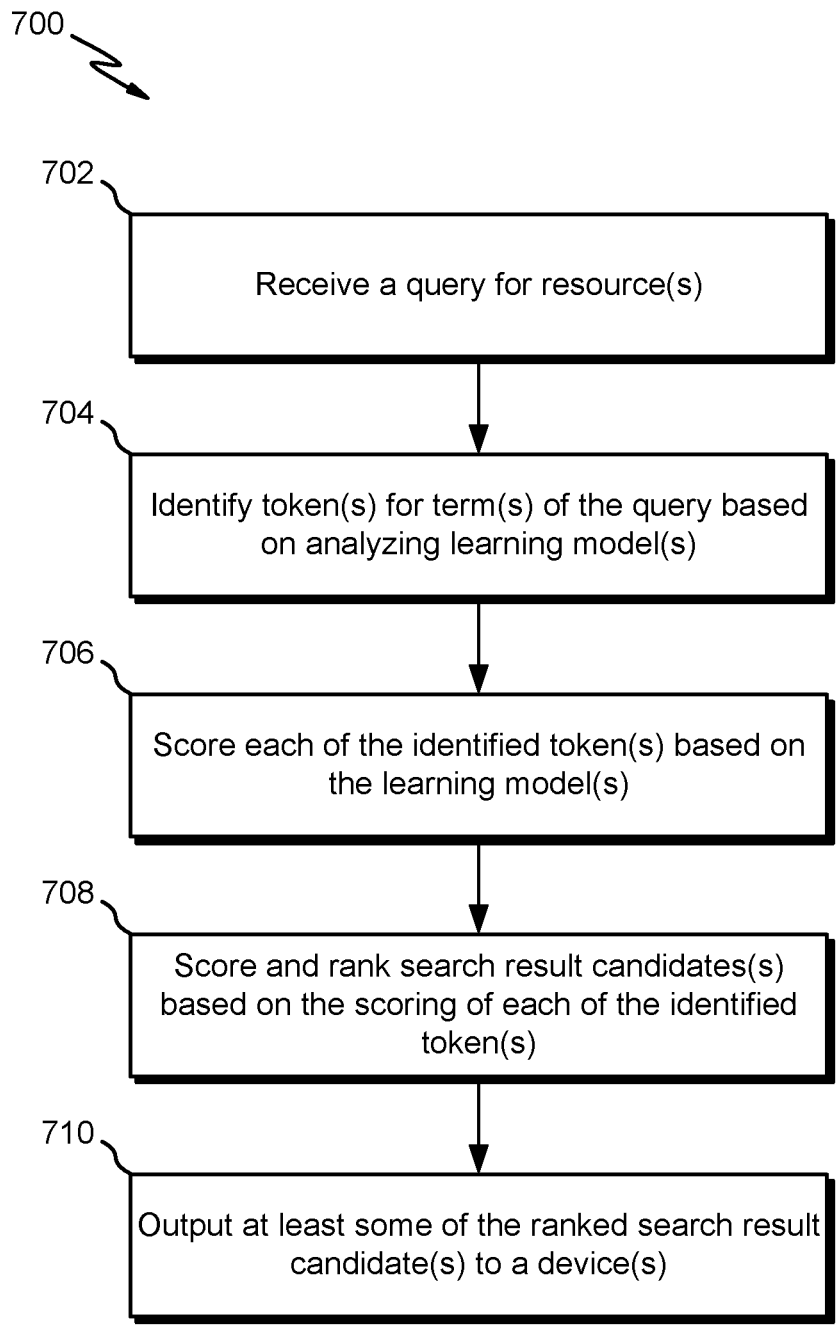
FIG. 7 is a flow diagram of an example process for ranking one or more search result candidates based on a query received, according to some embodiments.

FIG. 7 is a flow diagram of an example process 700 for ranking one or more search result candidates based on a query received, according to some embodiments. Per block 702, a query is received (e.g., by the tokenizer 106) for one or more resources (e.g., products, documents, links, websites, etc.). For example, a user may open a portal and input a query string within a search engine field. A "portal" as described herein in some embodiments includes a feature to prompt authentication and/or authorization information (e.g., a username and/or passphrase) such that only particular users (e.g., a corporate group entity) are allowed access to information. A portal can also include user member settings and/or permissions and interactive functionality with other user members of the portal, such as instant chat. In some embodiments a portal is not necessary to receive the query, but rather a query can be received via a public search engine (e.g., GOOGLE) or website such that no login is required (e.g., authentication and/or authorization information) and anyone can view the information. In response to a user inputting a query, such as a string of characters (e.g., "cheap jewelry"), the query is transmitted to the system, such as the tokenizer 106 of FIG. 1.

In some embodiments, the query is normalized by calculating the mean and variance of features for each query or query term to calculate and a Z score is calculated as follows:

$$z_{clicks(q,w)} = \frac{\overline{x}_{clicks(q)} - x_{clicks(q,w)}}{\sigma_{clicks(q)}} \qquad \text{Equation 3}$$

Although the features are represented by "clicks," it is understood that one or more features can be calculated, such as any represented in the frequency statistics 140. The normalization may occur because a query may include multiple terms that are each associated with a particular frequency of selections (e.g., clicks) and so the quantity of standard deviations from the mean a data point is calculated to score the term of the query, score result candidates, and/or determine distance in vector space.

Per block 704, one or more tokens can be identified (e.g., via the tokenizer 106 and the learning model(s) 124) for the query based on analyzing one or more learning models. In some embodiments, the one or more learning models represent the one or more learning models that are set within block 608 of FIG. 6. In some embodiments, one or more terms or tokens associated with the query are identified based on running the query through a learning model. A distance can be determined between one or more terms of the query and one or more vectors or tokens in vector space. The vector space in some embodiments includes a plurality of vectors or tokens that are oriented in vector space according to context similarity between the plurality of vectors. "Context similarity" can be or include vectors that are oriented or placed in vector spaced based on semantic similarity, selection statistics (e.g., as illustrated in block 606 of FIG. 6), and/or any suitable distance policy. In an illustrative example of token identification, referring back to FIG. 3, in response to the query "Toy Cars," the vectors "CARS" "blue" "red" "remote control" "brand X" "car type A" "push car" "car type B" and "brand Y" are identified as tokens in vector space 309 based on the distance "Cars" is to each vector in vector space. In some embodiments, the distance between the one or more tokens or vectors in vector space and the one or more terms of the query is based on a frequency of user selections associated with the one or more tokens (e.g., user selections 140 of FIG. 1, table 205 of FIG. 2).

Per block 706, each of the identified one or more tokens are scored based on the one or more learning models. In some embodiments, the one or more tokens or vectors can be scored based specifically on the distance between the one or more terms of a query and the one or more vectors or tokens in vectors space. A token can be scored higher the closer the token is to the one or more terms and the token can be scored lower the farther away the token is to the one or more terms. For example, referring back to FIG. 3, brand X may be scored higher than brand Y because it is closer to the term CARS in vector space 309. Likewise, "red" can be scored higher than "blue" because it is closer to the term CARS in vector space 309.

Per block 708, one or more search result candidates are scored and ranked based on the scoring of each of the identified tokens in block 706. For example, referring back to FIG. 5B, each of the titles are scored based on the individual tokens generated from the query "cheap jewelry." In some embodiments, the scoring of the one or more search result candidates is further based at least on matching a plurality of terms within the one or search result candidates to the one or more tokens such that a search result candidate is scored higher when the search result candidate includes a token of the one or more tokens that is scored over a high threshold. For example, referring back to FIG. 5B, the scoring of the search result candidate titles is based on matching the terms with the tokens and then adding the individual token scores up to receive a final ranked result. In some embodiments, one or more search result candidates are alternatively or additionally scored based at least on a context similarity and/or distance between the one or more terms/tokens of the query and the one or more vectors or tokens in vector space (e.g., as determined in block 704).

In some embodiments, the scoring of the one or more search result candidates includes utilizing an aggregation function, such as:

$$g(q, t) = \underset{w \in t}{agg}\{f_\theta(q, w)\} \qquad \text{Equation 4}$$

Accordingly, after learning a query-word model (e.g., word embedding vector model) an aggregation function, such as min, max, median, and mean can be calculated. The mean can include OOV (out-of-vocabulary) search result candidates such that the terms in a search result identifier do not necessarily need to match words as found in a query for resources. In an illustrative example of an aggregation mean score, each of the individual scores for each term in a search result candidate (e.g., product title) are added together and then divided by the quantity of individual scores to arrive at a final score. Each individual score for the search result candidate term can be scored by running the term through vector space (e.g., a word embedding vector model) and/or matching one or more terms in the search result identifier to a corresponding term in the query and reflecting the score of the corresponding query term (which was calculated at block 706) and then utilizing an aggregation function. In some embodiments, "each" term in the search result candidate and/or query is not scored or analyzed, but only selected terms can be utilized, such as through Inverse document frequency as described above.

Per block 710, at least some of the scored or ranked search result candidates are outputted to one or more devices. For example, referring back to FIG. 5B, one or more servers associated with the search engine system 102 can cause a client application (e.g., a web browser) of a user device (e.g., a mobile phone) to display the first title "0.5 carrot princess cut diamond ring $900" as an uppermost identifier within a search results page. The one or more servers can also cause a client application to display a second title "0.5 carrot radiant cut diamond ring $800" as in an area immediately underneath the first title as second ranked title. Further a third title "$2,000 leather ankle band" in some embodiments are not provided at all on a results page and/or are provided last (e.g., bottom of a results page).

Figure 8:
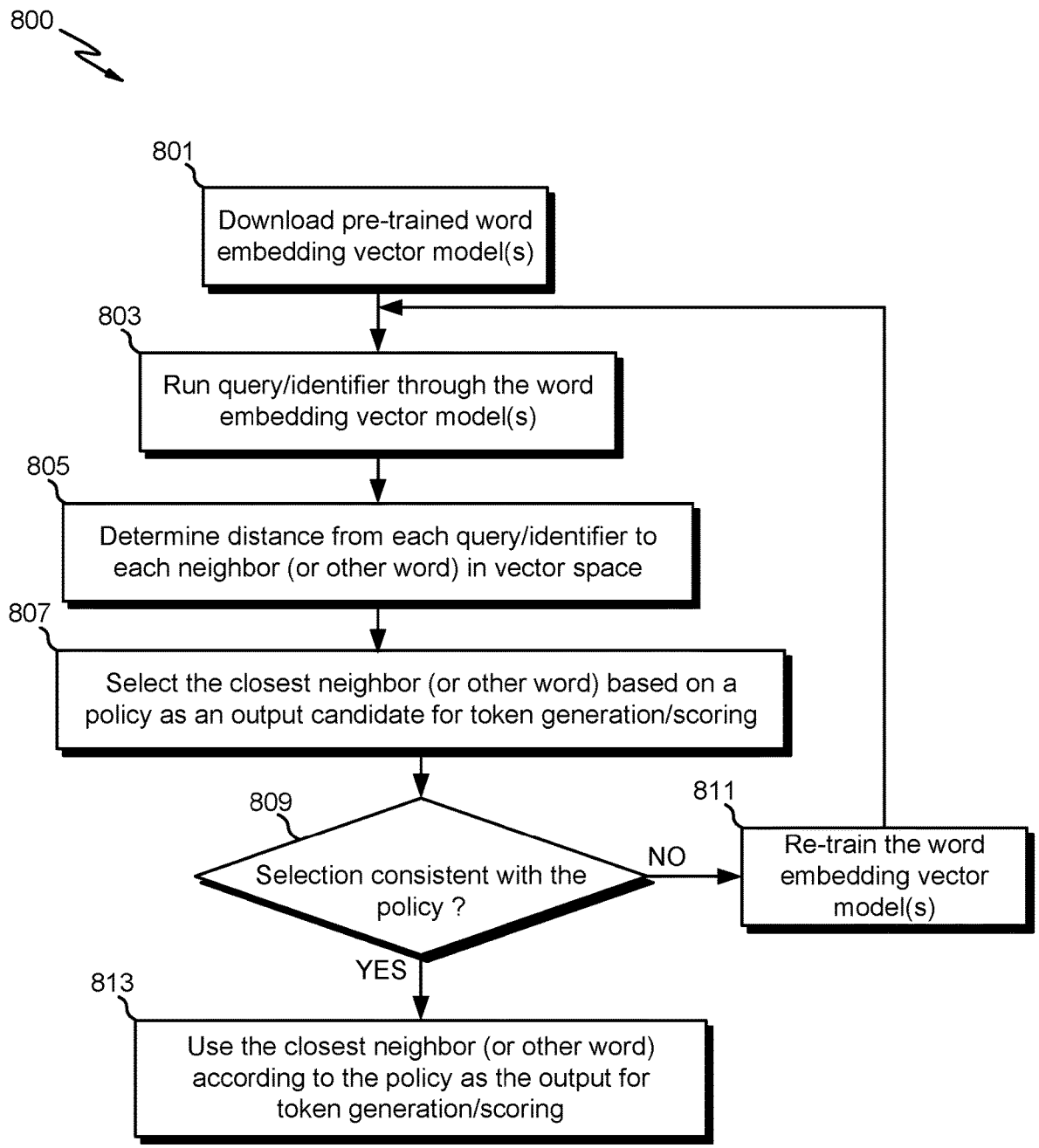
FIG. 8 is a flow diagram of an example process for generating or scoring one or more tokens based on running one or more queries or identifiers through one or more word embedding vector models, according to some embodiments.

FIG. 8 is a flow diagram of an example process 800 for generating or scoring one or more tokens based on running one or more queries or identifiers through one or more word embedding vector models, according to some embodiments. At block 801, one or more pre-trained word embedding vector models are downloaded. For example, a computing system in some embodiments receives a user request to download, from a website or other service, a word embedding vector model, such as a word2vec, which has each of its data points already mapped in vector space (e.g., the vector space 309 of FIG. 3). Accordingly, at some previous time, one or more sources, such as documents, social media posts, blogs, news feeds, dictionaries, periodicals, etc. have been run through the word embedding vector model and its corresponding string representations are mapped according to semantic similarity.

Per block 803, at a second time, one or more query terms and/or identifiers (e.g., search result candidates) are run through the word embedding vector model(s). Accordingly, the query terms/identifiers are mapped into the vector space according to the semantic similarity of other representations that were mapped at the pre-training phase. For example, referring back to FIG. 3, the query "Toy Cars" is run through the word embedding vector model and the vector space 309 is the output.

Per block 805, the distance (e.g., cosine distance) is determined from one or more terms in the query/identifier to some or each of its neighbors in vector space. In some embodiments, only each of the one or more terms' neighbors (e.g., the immediate words surrounding the one or more terms) are used to calculate distance to the one or terms. In other embodiments, the distance is calculated from the one or more terms to each word (not just neighbor) within the vector space (e.g., the vector space 309).

Per block 807, the closest neighbors (or other words) within a threshold distance to the one or more terms (e.g., CARS) are selected as an output candidates for tokenization based on a policy. In some embodiments, the policy specifies to select the words closest to the one or more terms in a particular distance X as candidates for token generation. For example, referring back to FIG. 3, if a term in the query "cars" is extracted and matched with a term "CARS" in vector space 309," CARS' closest neighbors within a threshold distance can be "blue" "red" "remote control" "brand X" "car type A" "push car" "car type B" and "brand Y." Therefore, these vectors are selected as output candidates for token generation for the query term "cars." In other embodiments, the policy specifies to select word representations that are not necessarily the closest neighbors to the one or more terms as the candidates, such as selecting a different ontology or words within a different threshold than the distance X, such as only those terms as indicated within the threshold 305 of FIG. 3.

Per block 809, it is determined whether the selection at block 807 is consistent with the policy. This is determined by quantitative measures (e.g., whether the token candidate is indeed the closes neighbor) and/or qualitative measures (e.g., whether the token candidate represents the one or more terms in an accurate manner). In an example illustration of the qualitative measure, the string "CARS" closes neighbor can incorrectly be "Man" instead of "brand X." Although a policy can specify to choose the closest neighbor or set of closest neighbors and the algorithm has indeed chosen the closest neighbor, it may not adequately represent the class or association that CARS belongs to, based on the statistics of user selections (e.g., within the table 205). This can be decided by a user, which determines that it wants "CARS" to be represented as more of generalized class or ontology instead of an inaccurate specific value. Thus, in this situation the candidate selection of "Man" as a token would be inconsistent with the policy even though quantitatively the policy was calculated correctly. In some embodiments, there is no user feedback, but instead an unsupervised algorithm is used to determine whether the selection is consistent with the policy or used to re-train. In these embodiments, a set of rules can be used to determine whether the selection is consistent with the policy, such as whether the selection was quantitatively accurate and whether the selection met one or more rules (e.g., whether the selection was the name of the ontological class).

Per block 811, if the selection at block 807 is not consistent with the policy, the word embedding vector model(s) are re-trained. For example, a user or unsupervised algorithm can upload several other various source documents into the model and/or manually change where one or more terms are mapped in vector space. For example, referring back to FIG. 3, if the term "man" is associated with "CAR" in the vector space 309, the user or unsupervised algorithm can upload additional sources (e.g., within the remote data source(s) 120 of FIG. 1), such as more statistics associated with the table 305, specialized website pages that include consumer information associated with the query/identifier, selected dictionary words associated with the query/identifier, news articles discussing the query/identifier, etc. In another example, if a first term was included in a query/identifier, a user can move one or more terms in vector space closest to the first term in vector space such that upon another run, the one or more terms selected as the candidate tokens instead of some other word. After the data is re-trained at block 811, the one or more terms of the query/identifier(s) are again run through the word embedding vector model(s) at block 803. Blocks 807 and 809 are repeated for the second run until the selection is consistent with the policy at block 809.

Per block 813, if the selection at block 807 is consistent with the policy, the closest set of neighbors (or other words) are used as the actual output for tokens generated for a query and/or identifier according to whatever the policy is. For example, referring to FIG. 2, each of the tokens under the "token" field of the table 203 may be selected as tokens and input into the table 203, as opposed to the terms "ATV" "man" "king" represented in the vector space 309 of FIG. 3.

Figure 9:
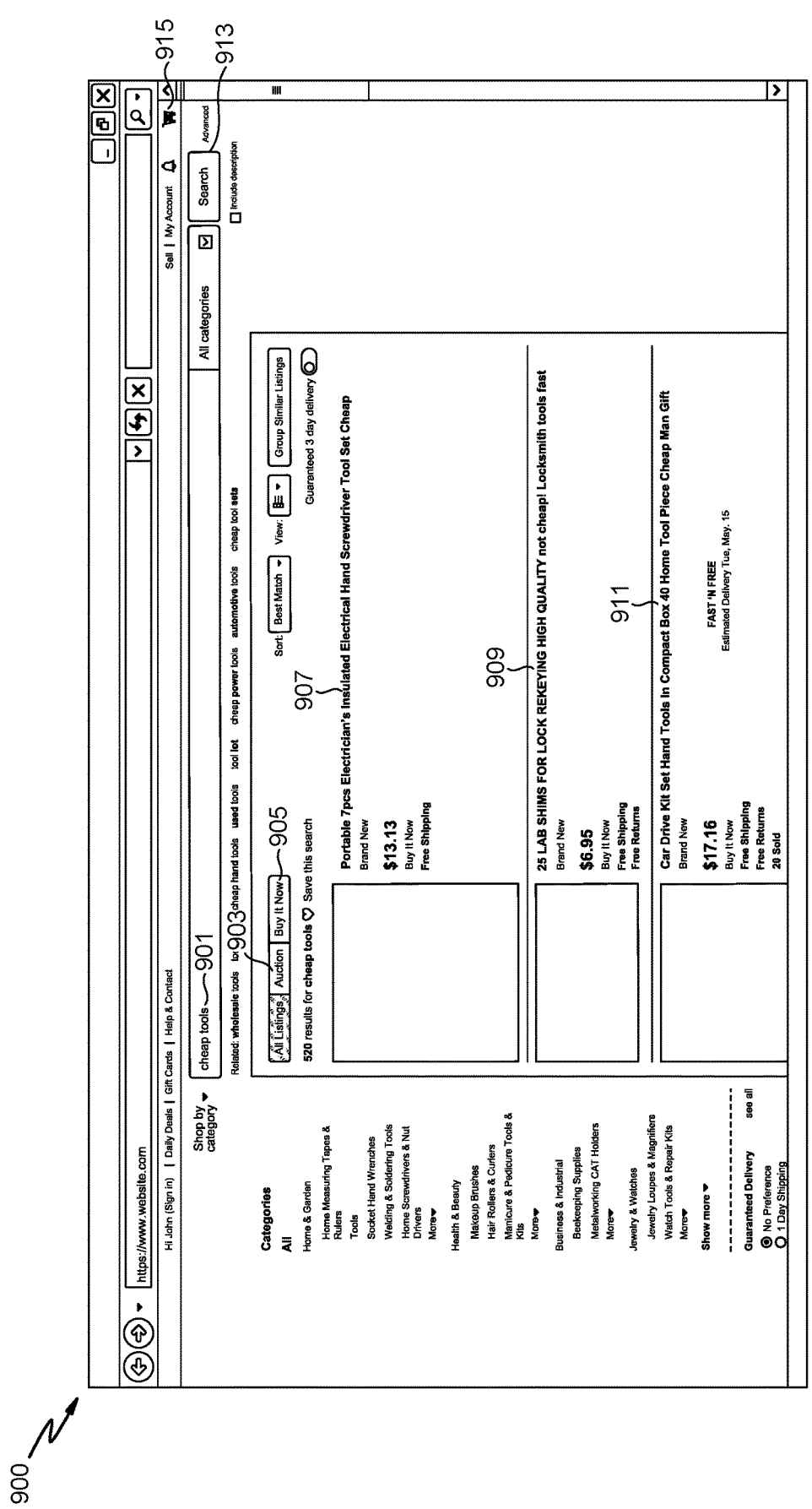
FIG. 9 is a screenshot of an example search interface 900 and result page, according to some embodiments.

FIG. 9 is a screenshot of an example search interface 900 and result page, according to some embodiments. The query interface 900 illustrates that a user has issued the query "cheap tools" 901 within a search field. In response of a user selection of the search button 913, the result page can be displayed that includes the search result identifiers 907 ("Portable 7 pc Electrician's Insulated Electrical Hand Screwdriver Tool Set Cheap"), 909 ("25 LAB SHIMS FOR LOCK REKEYING HIGH QUALITY not cheap! Locksmith tools fast"), and 911 ("Car Drive Kit Set Hand tools in Compact Box 40 Home Tool Piece Cheap Man Gift"). In some embodiments, the search result identifiers 907, 909, and 911 are displayed in response to one or more actions as described in FIGS. 6-8. For example, one or more terms of the query "cheap tools" is located in vector space and associated with a closest set of neighbors (tokens) that include one or more terms as found in the search result identifiers 907, 909, and 911. Such terms can then be individually scored and associated with search results candidates for final scoring or ranking, as described above. For example, search result identifier 909 may be scored and ranked the highest and accordingly gets displayed to the top of the results page. The search result identifier 909 may be scored and ranked second highest and accordingly gets displayed just under the result candidate 907. The search result identifier 911 may be scored and ranked third highest and accordingly gets displayed just under the result identifier 909.

In some embodiments, the user can instead or additionally select other features, such as the "Buy it Now" tab 905. This may allow the user to immediately buy any of the products associated with the result identifiers 907, 909, and/or 911.

Accordingly, for example, as soon as the user selects one of the result identifiers, the result identifier can be tokenized (e.g., via the tokenizer 106) and each token of the identifier can be incremented for a "BIN" frequency statistic (e.g., the BIN frequency 116 and/or "BIN?" column of table 203). The tokens can then be run through one or more learning models (e.g., the learning model(s) 124), as described above. Alternatively or additionally, the user may select the "auction" tab 903. In some embodiments, in response to a user selection of the tab 903, the same or different search results are displayed and in response to the user selecting a result identifier, as descried above, the result identifier can be tokenized and each token of the identifier can be incremented for a "WATCH" frequency statistics (e.g., watch frequency 118). The tokens can then be run through one or more learning models, as described above.

Figure 10:
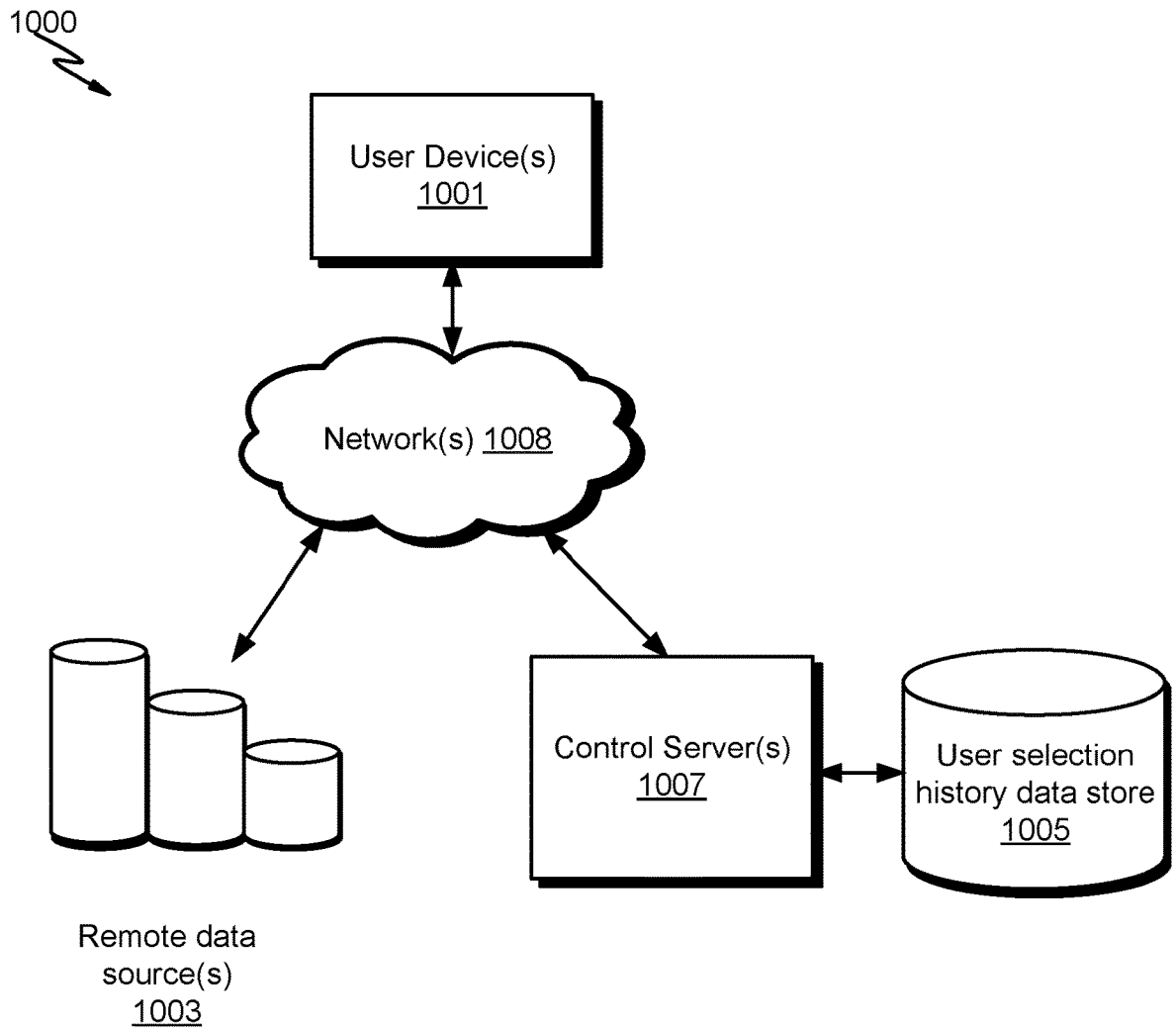
FIG. 10 is a block diagram of a computing environment in which aspects of the present disclosure can be implemented within, according to particular embodiments.

FIG. 10 is a block diagram of a computing environment 1000 in which aspects of the present disclosure can be implemented within, according to particular embodiments. The computing environment 1000 includes one or more user devices 1001, one or more control servers 1007 coupled to a user selection history data store 10005, and one or more remote data sources 1003 that are communicatively coupled with each other via one or more networks 1008. In some embodiments, the computing environment 1000 may be implemented within a cloud computing environment, or use one or more cloud computing services. Consistent with various embodiments, a cloud computing environment includes a network-based, distributed/data processing system that provides one or more cloud computing services. Further, a cloud computing environment can include many computers, hundreds or thousands of them or more, disposed within one or more data centers and configured to share resources over the network 918. For example, the one or more control servers 1007 may include several computers that are each associated with a single component within the search engine system 102 of FIG. 1. For example, a first computer may host the tokenizer 106 and a second computer may host the logging module 122, etc.

These components can communicate with each other via the network(s) 1008, which can be or include any suitable network such as a Personal Area Network (PAN) (e.g., a Bluetooth® (by BLUETOOTH SIG) network), a local area network (LAN), a general wide area network (WAN), and/or a public network (e.g., the internet).

In some computing environments, more or fewer components may be present than illustrated in FIG. 10. In various embodiments, some or each of the components—e.g., the control server(s) 1007 and the remote data source(s) 1003—represent separate computing devices. In some embodiments, some or each of the components represent particular compute instances of a single computing device (e.g., program modules, computing components within a chassis, a blade server within a blade enclosure, an I/O drawer, a processor chip, etc.)

In some embodiments, the computing environment 900 is the environment in which the processes 600, 700, 800 and/or any other action described herein can be implemented within. The user device(s) 1001 include any device associated with a user, such as a mobile phone, desktop computer, sensor devices, etc. In some instances, these devices include a user interface and/or query interface (e.g., the query interface 900 of FIG. 9). Users can also transmit requests from the one or more user devices 1001, such as the query 108 of FIG. 1, the query 307, and or the query received at block 702.

The one or more control servers 1007 in embodiments represent the system that acts as an intermediary or coordinator for executing the one or more queries from the one or more user devices 1001. For example, in some embodiments the one or more control servers 1007 includes some or each of the components as described in FIG. 1, such as the tokenizer 106, the logging module 122, the one or more learning models 124, the scoring module 130, and/or the training module 126. The user selection data store 1005 in particular embodiments represents a data store (e.g., a database) of statistics data structures configured to receive and increment user selections. For example, the statistics 140 and/or the tables within FIG. 2 and FIG. 4 can be stored to the user selection history data store 1005.

The one or more remote data sources 1003 in embodiments represent third party services or vendors that provide business logic to connect with the control server(s) 1007 APIs and/or other remote data sources to help generate user interfaces and/or render applications. For example, in some embodiments, the remote data sources 1007 includes the remote data sources 140 described in FIG. 1.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Figure 11:
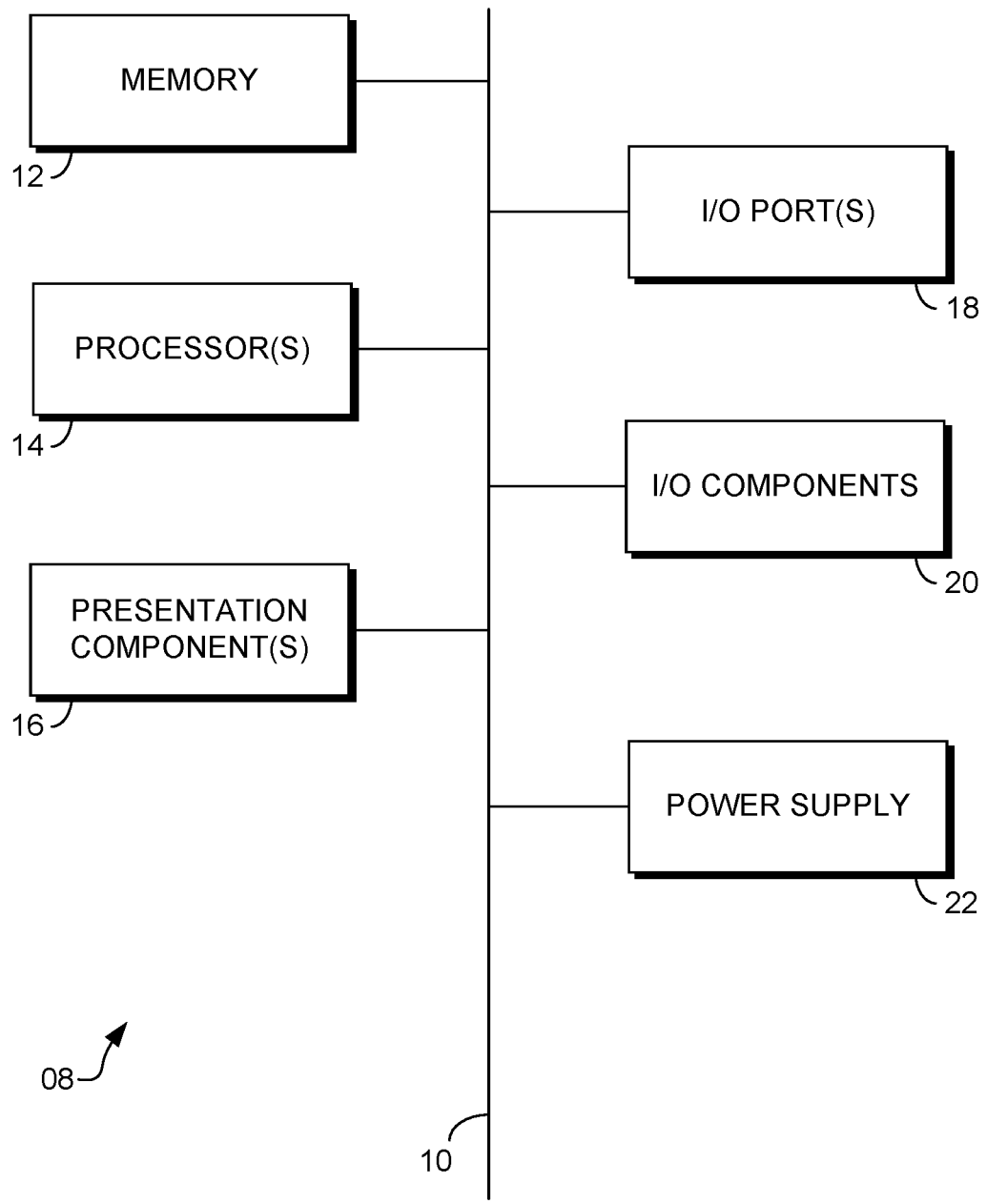
FIG. 11 is a block diagram of a computing device in which aspects of the present disclosure can be implemented within, according to various embodiments.

With reference to FIG. 11, computing device 008 includes bus 10 that directly or indirectly couples the following devices: memory 12, one or more processors 14, one or more presentation components 16, input/output (I/O) ports 18, input/output components 20, and illustrative power supply 22. Bus 10 represents what may be one or more busses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that this diagram is merely illustrative of an exemplary computing device that can be used in connection with one or more embodiments of the present invention. Distinction is not made between such categories as "workstation," "server," "laptop," "hand-held device," etc., as all are contemplated within the scope of FIG. 11 and reference to "computing device."

In some embodiments, the computing device 008 represents the physical embodiments of one or more systems and/or components described above. For example, the computing device 008 can be the one or more user devices 1001, control server(s) 1007, and/or the remote data source(s) 1003 of FIG. 10. The computing device 008 can also perform some or each of the blocks in the processes 600, 700, and/or 800. It is understood that the computing device 008 is not to be construed necessarily as a generic computer that performs generic functions. Rather, the computing device 008 in some embodiments is a particular machine or special-purpose computer. For example, in some embodiments, the computing device 008 is or includes: a multi-user mainframe computer system, a single-user system, or a server computer or similar device that has little or no direct user interface, but receives requests from other computer systems (clients), a desktop computer, portable computer, laptop or notebook computer, tablet computer, pocket computer, telephone, smart phone, smart watch, or any other suitable type of electronic device.

Computing device 008 typically includes a variety of computer-readable media. Computer-readable media can be any available media that can be accessed by computing device 008 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 008. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 12 includes computer storage media in the form of volatile and/or nonvolatile memory. The memory may be removable, non-removable, or a combination thereof. Exemplary hardware devices include solid-state memory, hard drives, optical-disc drives, etc. Computing device 008 includes one or more processors 14 that read data from various entities such as memory 12 or I/O components 20. Presentation component(s) 16 present data indications to a user or other device. Exemplary presentation components include a display device, speaker, printing component, vibrating component, etc.

I/O ports 18 allow computing device 008 to be logically coupled to other devices including I/O components 20, some of which may be built in. Illustrative components include a microphone, joystick, game pad, satellite dish, scanner, printer, wireless device, etc. The I/O components 20 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 008. The computing device 008 may be equipped with depth cameras, such as, stereoscopic camera systems, infrared camera systems, RGB camera systems, and combinations of these for gesture detection and recognition. Additionally, the computing device 008 may be equipped with accelerometers or gyroscopes that enable detection of motion.

As described above, implementations of the present disclosure relate to automatically generating a user interface or rendering one or more applications based on contextual data received about a particular user. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

Definitions

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "data store" as described herein is any type of repository for storing and/or managing data, whether the data is structured, unstructured, or semi-structured. For example, a data store can be or include one or more: databases, files (e.g., of unstructured data), corpuses, digital documents, etc.

A "module" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

The term "real time" includes any time frame of sufficiently short duration as to provide reasonable response time for information processing as described. Additionally, the term "real time" includes what is commonly termed "near real time," generally any time frame of sufficiently short duration as to provide reasonable response time for on-demand information processing as described (e.g., within a portion of a second or within a few seconds). These terms, while difficult to precisely define, are well understood by those skilled in the art.

The terms first (e.g., first cache), second (e.g., second cache), etc. are not to be construed as denoting or implying order or time sequences unless expressly indicated otherwise. Rather, they are to be construed as distinguishing two or more elements. In some embodiments, the two or more elements, although distinguishable, have the same makeup. For example, a first memory and a second memory may indeed be two separate memories but they both may be RAM devices that have the same storage capacity (e.g., 4 GB).

The term "causing" or "cause" means that one or more systems (e.g., computing devices) and/or components (e.g., processors) may in isolation or in combination with other systems and/or components bring about or help bring about a particular result or effect. For example, a server computing device may "cause" a message to be displayed to a user device (e.g., via transmitting a message to the user device) and/or the same user device may "cause" the same message to be displayed (e.g., via a processor that executes instructions and data in a display memory of the user device). Accordingly, one or both systems may in isolation or together "cause" the effect of displaying a message.

The term "computing system" means a single computing device (e.g., a mobile device) and/or multiple computing devices (e.g., multiple cloud computing nodes).

What is claimed is:

1. A non-transitory computer storage medium storing computer-useable instructions that, when used by one or more computing devices, cause the one or more computing devices to perform operations comprising:
   receiving one or more user selections associated with one or more identifiers;
   incrementing a data structure with a first frequency statistic and a second frequency statistic for one or more terms within the one or more identifiers;
   determining the first frequency statistic is higher than the second frequency statistic; and
   generating a plurality of vectors that are oriented in vector space according to (1) context similarity between the plurality of vectors and (2) the first frequency statistic being higher than the second frequency statistic.

2. The computer storage medium of claim 1, wherein the one or more user selections include a selection from a group consisting of: a selection to complete a purchase of an item, a selection to generate an offer for a particular item, a selection to disregard an item, a selection of an item for placement in a shopping cart, a selection to follow an item through a bidding process, and a selection for asking a question about an item.

3. The computer storage medium of claim 1, wherein the data structure includes a plurality of attributes that identify a corresponding user selection type, and wherein the plurality of attributes are populated based on a type associated with the one or more user selections.

4. The computer storage medium of claim 1, wherein the one or more computing devices further perform an operation comprising inputting each of the one or more terms of the one or more identifiers within the data structure as an individual record, and wherein the individual record includes a plurality of fields that are populated based on user selection type.

5. The computer storage medium of claim 1, wherein the one or more computing devices further perform operations comprising:
   receiving a first query for one or more resources;
   determining a distance between one or more terms of the first query and one or more vectors in the vector space; and
   scoring the one or more vectors based on the distance.

6. The computer storage medium of claim 5, wherein the one or more computing devices further perform operations comprising scoring one or more search result candidates based on the scoring of the one or more vectors.

7. A computer-implemented method comprising:
   receiving a set of user selections of one or more identifiers, the one or more identifiers correspond to one or more products for sale in an electronic marketplace;
   in response to the receiving of the set of user selections, incrementing a data structure with a first frequency statistic and a second frequency statistic for at least a first term within the one or more identifiers;
   determining the first frequency statistic is higher than the second frequency statistic; and
   based at least in part on the first frequency statistic being higher than the second frequency statistic, generating a first vector that is oriented in vector space;
   subsequent to the generating of the first vector, receiving a query for one or more resources;
   determining a distance between a second vector representing one or more terms of the query and the first vector in the vector space, wherein vectors within the vector space are oriented in the vector space according to (1) context similarity between the vectors and (2) the first frequency statistic being higher than the second frequency statistic; and
   scoring one or more search result candidates based at least on the distance.

8. The method of claim 7, further comprising scoring the first vector based on the distance between the first vector and the second vector in the vector space, wherein a higher score indicates that the first vector is closer to the second vector than a lower score that indicates the first vector is farther away from the second vector.

9. The method of claim 8, wherein the scoring of the one or more search result candidates is further based on the scoring of the first vector.

10. The method of claim 7, wherein the scoring of the one or more search result candidates is further based at least on matching a plurality of terms within the one or more search result candidates to one or more tokens, wherein a search result candidate is scored higher when the search result candidate includes a token of the one or more tokens that is scored over a high threshold.

11. The method of claim 7, wherein the distance between the second vector in the vector space and the first vector is additionally based on a frequency of user selections associated with the first vector.

12. The method of claim 7, further comprising:
generating the first vector by parsing each term of the one or more identifiers, wherein the each term corresponds to a set of values in the first vector.

13. The method of claim 12, further comprising:
incrementing, based on the set of user selections, a statistics data structure in response to the generating of the first vector; and
generating the vector space with the first vector within a word embedding vector model based on the incremented statistics data structure.

14. A system comprising:
at least one computing device having at least one processor; and
at least one computer readable storage medium having program instructions embodied therewith, the program instructions readable by the at least one processor to cause the system to:
receive a query for one or more resources;
identify tokens associated with the query based on running the query through a learning model, the tokens correspond to one or more terms that the query shares context similarity to based on a history of user selections;
scoring one or more search result candidates based at least on the context similarity between the tokens and the query; and
orienting the tokens in vector space according to the scoring of the one or more search result candidates, wherein a higher score has a closer context similarity.

15. The system of claim 14, wherein the program instructions further cause the system to score the tokens based on a distance between the one or more terms and the tokens in the vector space of a word embedding vector model, wherein the tokens are oriented in the vector space based at least on a sematic similarity between the vectors.

16. The system of claim 14, wherein the scoring of the one or more search result candidates is based at least on running the one or more search result candidates through a word embedding vector model.

17. The system of claim 14, wherein the scoring of the one or more search result candidates is further based at least on matching a plurality of terms within the one or more search result candidates to the tokens.

18. The system of claim 14, wherein the learning model includes a distance between the tokens in the vector space and the one or more terms of the query that is generated based on a frequency of user selections as an input to the learning model.

19. The system of claim 14, wherein the program instructions further cause the system to:
receive, prior to the receiving of the query, a set of user selections of one or more identifiers; and
generate the tokens by parsing each term of the one or more identifiers, wherein the each term corresponds to each of the tokens.

20. The system of claim 19, wherein the program instructions further cause the system to increment, based on the set of user selections, a statistics table in response to the generating of the tokens, the statistics table includes a plurality of attributes that correspond to a user selection type and a plurality of records that correspond to the tokens.

* * * * *